(12) United States Patent
Janning et al.

(10) Patent No.: US 6,446,049 B1
(45) Date of Patent: Sep. 3, 2002

(54) METHOD AND APPARATUS FOR TRANSMITTING A DIGITAL INFORMATION SIGNAL AND VENDING SYSTEM INCORPORATING SAME

(75) Inventors: Joseph J. Janning, West Chester; Eugene A. Janning, Jr., Cincinnati; Robert G. Schumacher, Jr., West Chester, all of OH (US)

(73) Assignee: Pole/Zero Corporation, West Chester, OH (US)

( * ) Notice: Subject to any disclaimer, the term of this patent is extended or adjusted under 35 U.S.C. 154(b) by 0 days.

(21) Appl. No.: 09/162,748

(22) Filed: Sep. 29, 1998

Related U.S. Application Data

(63) Continuation-in-part of application No. 08/956,732, filed on Oct. 23, 1997, now Pat. No. 6,064,308.
(60) Provisional application No. 60/060,370, filed on Sep. 29, 1997, and provisional application No. 60/029,464, filed on Oct. 25, 1996.

(51) Int. Cl.[7] ............................................. G06F 17/60
(52) U.S. Cl. ........................ 705/40; 141/94; 700/231
(58) Field of Search .......................... 700/231; 141/94; 235/381, 383; 705/40, 77, 34

(56) References Cited

U.S. PATENT DOCUMENTS

| | | | | |
|---|---|---|---|---|
| 2,774,060 A | | 12/1956 | Thompson | 340/572.5 |
| 2,800,104 A | | 7/1957 | Cameron et al. | 119/720 |
| 3,098,971 A | | 7/1963 | Richardson | 325/19 |
| 3,238,459 A | * | 3/1966 | Landee | 375/331 |
| 3,493,955 A | | 2/1970 | Minasy | 340/572.3 |
| 3,500,373 A | | 3/1970 | Minasy | 340/572.4 |
| 3,518,546 A | | 6/1970 | Augenblick et al. | 455/19 |
| 3,631,442 A | | 12/1971 | Fearon | 340/572.2 |
| 3,631,484 A | | 12/1971 | Augenblick | 342/46 |
| 3,665,449 A | | 5/1972 | Elder et al. | 340/572.1 |

(List continued on next page.)

FOREIGN PATENT DOCUMENTS

| | | |
|---|---|---|
| FR | 2455749 | 10/1981 |
| JP | 61149880 | 7/1986 |

OTHER PUBLICATIONS

*Antenna Engineering Handbook 2nd Ed.*, pp. 14–4 thru 14–19, publication date unknown.
"Zero Bias Silicon Schotcky Barrier Detector Diodes," *M/A–Com Semiconductor Products Operation.* pp. 2–55 through 2–58.
"Zero Bias Detector Diodes," *M/A–Com Semiconductor Products Operation*, pp. 6–93 thru 6–99, publication date known.

(List continued on next page.)

*Primary Examiner*—F. J. Bartuska
(74) *Attorney, Agent, or Firm*—Holland & Knight LLP

(57) ABSTRACT

A cashless business transaction system (e.g., a vending system, a material tracking system, or a highway toll system) incorporates a method and apparatus for transmitting a digital information signal. A signal generator (311) generates a constant frequency signal. A phase modulator (305) varies the instantaneous phase of the constant frequency signal to represent digital information, thereby producing a phase modulated signal (325). A tuned resonant circuit (307) filters and averages the phase modulated signal to produce a simulated FM signal, and transmits the simulated FM signal via its antenna (309). One such business transaction system (e.g., a vending system) incorporates such a transmitter to facilitate transmission of billing information from a device located within a substantially electrically shielded environment. Another such business transaction system preferably incorporates such a transmitter to facilitate half-duplex transmission of digital information regardless of whether or not the digital information is transmitted from a device located within a substantially electrically shielded environment.

37 Claims, 14 Drawing Sheets

Microfiche Appendix Included
(1 Microfiche, 82 Pages)

U.S. PATENT DOCUMENTS

| | | | |
|---|---|---|---|
| 3,689,885 A | 9/1972 | Kaplan et al. | 340/825.34 |
| 3,707,711 A | 12/1972 | Cole et al. | 340/572.2 |
| 3,711,848 A | 1/1973 | Martens | 340/572.2 |
| 3,753,421 A | 8/1973 | Peck | 119/721 |
| 3,754,226 A | 8/1973 | Fearon | 340/572.3 |
| 3,820,103 A | 6/1974 | Fearon | 340/572.2 |
| 3,836,842 A | 9/1974 | Zimmerman et al. | 324/239 |
| 3,859,624 A | 1/1975 | Kriofsky et al. | 348/941 |
| 3,895,368 A | 7/1975 | Gordon et al. | 340/572.4 |
| 3,964,024 A | 6/1976 | Hutton et al. | 340/152 |
| 3,968,272 A | 7/1976 | Anand | 438/570 |
| 4,001,718 A | 1/1977 | Wilson et al. | 331/65 |
| 4,063,229 A | 12/1977 | Welsh et al. | 340/571 |
| 4,068,189 A | 1/1978 | Wilson | 331/65 |
| 4,087,791 A | 5/1978 | Lemberger | 340/825.54 |
| 4,129,855 A | 12/1978 | Rodrian | 340/825.34 |
| 4,136,338 A | 1/1979 | Antenore | 340/551 |
| 4,262,632 A | 4/1981 | Hanton et al. | 119/51.02 |
| 4,274,089 A | 6/1981 | Giles | 340/572.2 |
| 4,302,846 A | 11/1981 | Stephen et al. | 455/19 |
| 4,331,957 A | 5/1982 | Enander et al. | 342/22 |
| 4,335,682 A | 6/1982 | Gonda et al. | 119/719 |
| 4,399,821 A | 8/1983 | Bowers | 600/301 |
| 4,413,254 A | 11/1983 | Pinneo et al. | 340/572.6 |
| 4,471,344 A | 9/1984 | Williams | 340/572.2 |
| 4,503,399 A | 3/1985 | Carr | 340/573.3 |
| 4,510,495 A | 4/1985 | Sigrimis et al. | 340/825.54 |
| 4,532,932 A | 8/1985 | Batty, Jr. | 128/631 |
| 4,618,861 A | 10/1986 | Gettens et al. | 340/825.54 |
| 4,623,877 A | 11/1986 | Buckens | 340/572 |
| 4,642,640 A | 2/1987 | Woolsey et al. | 342/187 |
| 4,644,286 A | 2/1987 | Torre | 329/572.4 |
| 4,656,478 A | 4/1987 | Leuenberger | 342/51 |
| 4,670,740 A | 6/1987 | Herman et al. | 340/572.2 |
| 4,679,046 A | 7/1987 | Curtis et al. | 342/51 |
| 4,720,701 A | 1/1988 | Lichtblau | 340/572 |
| 4,733,633 A | 3/1988 | Yarnall, Sr. et al. | 119/721 |
| 4,736,207 A | 4/1988 | Siikarla et al. | 343/895 |
| 4,745,882 A | 5/1988 | Yarnall, Sr. et al. | 119/721 |
| 4,766,847 A | 8/1988 | Venczel et al. | 119/721 |
| 4,777,478 A | 10/1988 | Hirsch et al. | 340/573.3 |
| 4,783,646 A | 11/1988 | Matsuzaki | 340/572.5 |
| 4,802,482 A | 2/1989 | Gonda et al. | 119/720 |
| 4,814,751 A | 3/1989 | Hawkins et al. | 340/573.1 |
| 4,847,592 A | 7/1989 | Hogen Esch et al. | 340/572.8 |
| 4,885,571 A | 12/1989 | Pauley et al. | 340/573.4 |
| 4,890,111 A | 12/1989 | Nicolet et al. | 342/51 |
| 4,898,120 A | 2/1990 | Brose | 119/721 |
| 4,910,500 A | 3/1990 | Carr | 340/573.3 |
| 4,918,425 A | 4/1990 | Greenberg et al. | 340/539 |
| 4,924,211 A | 5/1990 | Davies | 340/573.4 |
| 4,952,913 A | 8/1990 | Pauley et al. | 528/272 |
| 4,967,695 A | 11/1990 | Giunta | 119/721 |
| 4,967,696 A | 11/1990 | Tobias | 119/719 |
| 4,980,671 A | 12/1990 | McCurdy | 340/568.1 |
| 4,992,794 A | 2/1991 | Brouwers | 342/51 |
| 5,027,107 A | 6/1991 | Matsuno et al. | 340/572.7 |
| 5,030,940 A | 7/1991 | Siikarla | 340/572.2 |
| 5,054,428 A | 10/1991 | Farkus | 119/720 |
| 5,061,918 A | 10/1991 | Hunter | 340/573.2 |
| 5,065,138 A | 11/1991 | Lian et al. | 340/572.2 |
| 5,067,441 A | 11/1991 | Weinstein | 119/721 |
| 5,241,923 A | 9/1993 | Janning | 119/721 |
| 5,347,263 A | 9/1994 | Carroll et al. | 346/572 |
| 5,359,522 A * | 10/1994 | Ryan | 705/413 |
| 5,430,633 A | 7/1995 | Smith | 363/20 |
| 5,460,124 A | 10/1995 | Grimsley et al. | 119/721 |
| 5,493,312 A | 2/1996 | Knebelkamp | 343/860 |
| 5,575,242 A | 11/1996 | Davis et al. | 340/573.3 |
| 5,605,182 A | 2/1997 | Oberrecht et al. | 141/94 |
| 5,794,569 A | 8/1998 | Titus et al. | 119/721 |
| 5,824,891 A * | 10/1998 | Monson | 73/146.5 |
| 5,913,180 A * | 6/1999 | Ryan | 702/45 |
| 5,923,572 A * | 7/1999 | Pollock | 700/282 |
| 5,926,093 A | 7/1999 | Bowers et al. | 340/572.1 |

OTHER PUBLICATIONS

Brochure entitled "Pet Alert™ Dog and Cat Containment System" by Future–Tech, Inc., Columbus, Ohio, publication date unknown.

Brochure entitled "Freedom Fence™ for Dogs" by Freedom Fence™ Inc., North Adams, MA, publication date unknown.

Training Manual; Dog Guard for the Life of Your Dog, publication date unknown.

Installation Manual; Dog Guard for the Life of Your Dog, publication date unknown.

Leaflet entitled "IF–Invisible Fencing"—The Invisible Fence Co., Cinti, OH, publication date unknown.

Leaflet entitled "Is Your Dog Important to You?", publication date unknown.

Advertisement for K–9 Hidden Fence, REACH® Magazine, "Reward–Some Dogs Will Stop At Nothing," Dogwatch, Inc., publication date unknown.

Brochure entitled "An Innovative Concept in Fencing," Pet Perimeters, Fenceless Boundary Systems, Hudson, Ohio, publication date unknown.

Brochure entitled "Everyday Reasons to Get Invisible Fencing®," copyright 1990.

Leaflet entitled "The Great Freedom Fence™ Raw Hamburger Test," publication date unknown.

Advertisement "Underground Pet Containment System," publication date unknown.

Brochure, SAW Delay Lines, ©1988, Sawtek Inc., dated Jan., 1988.

Microchip Publication No. D530189D entitled "EEPROM Memory Programming Specification," 1996, Microchip Technology, Inc., pp. 1–5.

Stutzman, W.L. et al. Antenna Theory and Design, N.Y., John Wiley & Sons (1981), p. 79 TK 7871.6S877.

Microchip Publication No. DS00589A entitled "A PC–Based Development Programmer for the PIC16C84"(pp. 1–6) copyright 1994 Microchip Technology Inc.

Microchip Publication No. DS30081B entitled "8–Bit CMOS EEPROM Microcontroller" (pp. 1–64) copyright 1993 Microchip Technology Incorporated.

"Mobil Speedpass: how it works," http://www.mobil.com/speedpass/html/how_it_works.html (publication date unknown—printed from the Web on Oct. 12, 1998.

"Mobile Speedpass: how it works;" http://www.mobil.com/speedpass/html/technical.html (publication date unknown—printed from the Web on Oct. 12, 1998).

"Mobil Speedpass: frequently asked questions;" http://www.mobil.com/speedpass/html/questions.html, pp 1–4 (publication date unknown—printed from the Web on Oct. 11, 1998).

* cited by examiner

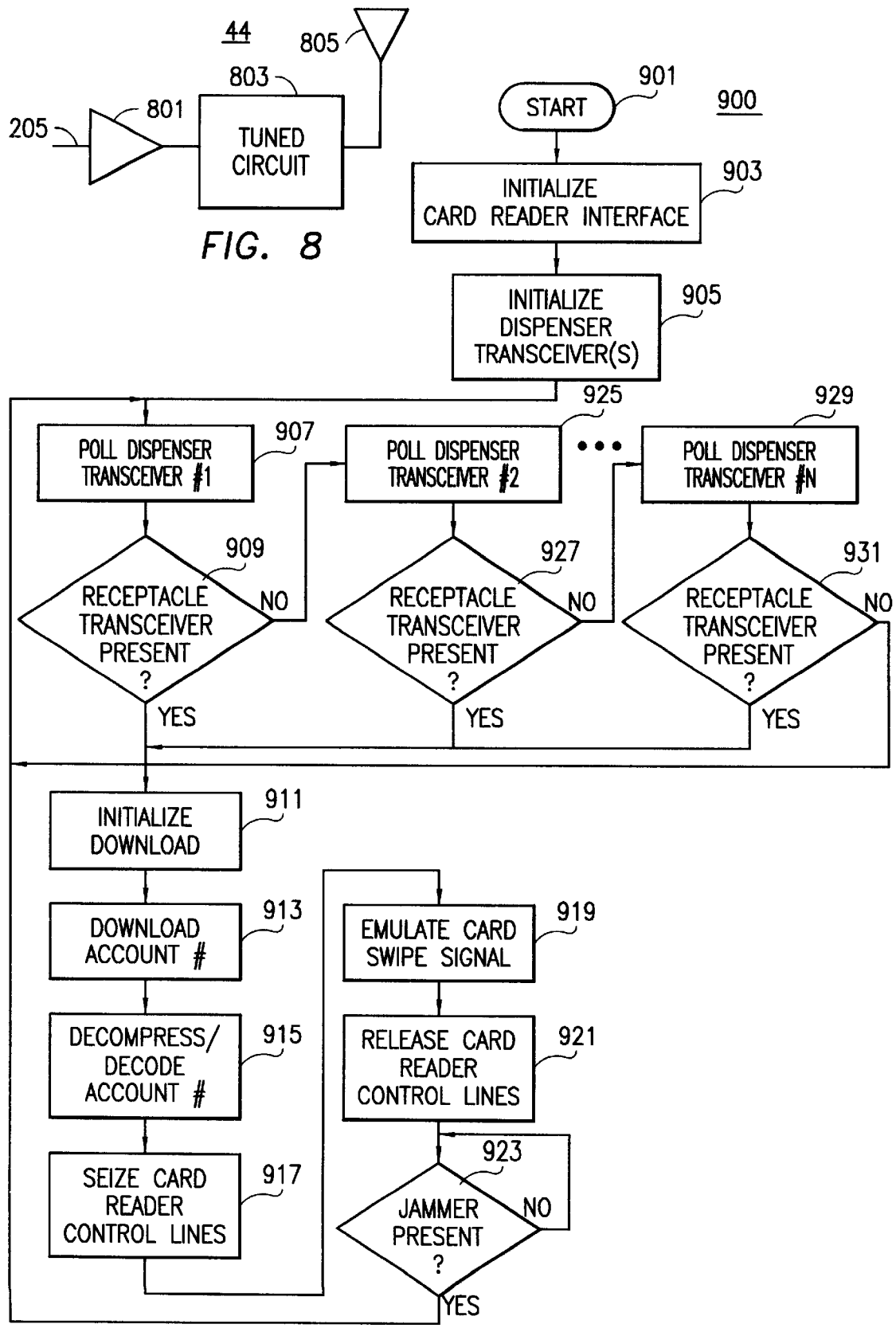

METHOD AND APPARATUS FOR TRANSMITTING A DIGITAL INFORMATION SIGNAL AND VENDING SYSTEM INCORPORATING SAME

CROSS REFERENCE TO RELATED APPLICATIONS

This application is a continuation-in-part of commonly-assigned U.S. patent application Ser. No. 08/956,732, filed Oct. 23, 1997, now U.S. Pat. No. 6,064,308 issued May 16, 2000 and claims benefit of Provisional Appl No. 60/029,464 filed Oct. 25, 1996 and No. 60/060,390 filed Sep. 29, 1997. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Priority under 35 U.S.C. §119(e) is hereby claimed to co-pending, commonly-assigned U.S. Provisional Application No. 60/060,370, filed Sep. 29, 1997 and entitled "Apparatus and Method for Transmitting an Encoded Signal Through a Metallic Surface and Vending System Incorporating Same", which is expressly incorporated herein by reference in its entirety to form part of the present disclosure.

REFERENCE TO MICROFICHE APPENDIX

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This disclosure includes a Microfiche Appendix containing computer program listings consisting in total of one (1) sheet of microfiche including eighty-two (82) total frames which are expressly incorporated herein by reference in their entirety to form part of the present disclosure.

1. Field of the Invention

The present invention relates generally to radio transmission systems and, in particular, to a method and apparatus for wirelessly transmitting digital information that may be employed in wireless point-of-sale vending systems, such as pay-at-the-pump fuel dispensing systems.

2. Background of the Disclosure

Reflecting an ongoing effort to provide retailers and others with a competitive advantage, various types of cashless vending systems are known in the art. For example, some vending machines are equipped with card reading devices that enable the machines to accept payments using credit cards and/or debit cards. The ability to accept cashless payments provides a number of important advantages. Vendors are able to make sales to persons who may not possess cash or coinage in necessary amounts or denominations and can gain access to valuable data on buying behaviors. Consumers benefit by being required to carry less cash and by being provided with complete records of card transactions by the card issuer. Unlike cash, which can also be lost or stolen, credit card users benefit from various laws intended to protect cardholders from unauthorized purchases and other forms of fraud involving their accounts. Card purchases may also afford the consumer access to discounts, rebates, or other special incentive programs which are commonly linked to card usage.

In order to realize such advantages, it is known to provide fuel dispensers at filling stations with magnetic card reading devices for the purpose of accepting purchases to be charged to a credit or debit card account. One manufacturer of fuel dispensers, Gilbarco, Inc. of Greensboro, N.C., offers a card reading device under the trademark "CRIND" that includes a card receptacle to accept the magnetic card and also happens to accept cash. In addition to the advantages just noted, providing card reading devices directly at the "gas pump" allows customers to make their purchases quickly without the need to walk to a cashier (possibly subjecting one to inclement weather), wait in line, or count change.

In an effort to provide an even greater degree of speed and convenience to customers, one major oil company has recently introduced another system to facilitate the vending of fuel at filling stations. This system, which typically augments rather than replaces the magnetic card reading devices already present at the pump, is presently being promoted under the trademark "SPEEDPASS". The "SPEEDPASS" system is based on radio frequency identification (RFID) technology marketed by Texas Instruments under the trademark "TIRIS." "TIRIS" technology has also reportedly been employed to track items in a variety of material handling systems and to automatically assess tolls to vehicles on toll roads without the necessity of stopping the vehicle.

Customers interested in using the "SPEEDPASS" fuel vending system enroll by filling out a form that requests information identifying a credit card account to which purchases made using the system are to be posted. This credit card information is electronically encoded into a high frequency (2.45 GHz) radio frequency (RF) transponder device that is small enough to be attached to a key ring or carried in some other manner by the consumer to whom the device is issued. The fuel dispensers at participating filling stations are provided internally with a receiving unit having an antenna mounted beneath a designated area on the external surface of the dispenser. The designated area is prominently marked with identifying indicia and printed instructions for using the "SPEEDPASS" system. The instructions direct the consumer to bring the transponder device into proximity of the designated area. When this is done, the receiving unit within the dispenser picks up the encoded account information transmitted by the transponder device. Once the information is appropriately decoded, it is used to authorize a purchase and, at an appropriate time (such as on completion of the dispensing operation), to post relevant information relating to the purchase (such as the amount of the purchase, the time of day the purchase was made and the like) to the corresponding account of the customer. The purchase is subsequently reflected on an invoice or billing statement provided by the credit card company or other entity.

While systems, such as the "SPEEDPASS" system, may offer an incremental improvement in speed and convenience over use of a credit card, they also suffer certain drawbacks. Notably, if the transponder is lost or stolen, it can be used without authorization at any participating station. The use of off-the-shelf transponder devices may also present a security risk. Such risk may be reduced by encoding the transponder with a secondary account number that identifies, but does not actually represent, an actual credit card or debit account number. While secondary account encoding affords additional security, such an approach limits or complicates universal acceptance of the system by vendors other than the issuer of the transponder due to the need to make available to other vendors a database cross referencing the actual and secondary account numbers. It is a disadvantage to the consumer to be limited to use of the system with only a single vendor. It is likewise undesirable to require a consumer to carry multiple transponders in order to make purchases from a corresponding multiple number of vendors.

Systems utilizing a high frequency RF carrier are also of limited utility due to problems associated with the electric field shielding effects of vehicle bodies and/or metallic structures used in and around fuel pumps. Such shielding effects require that the transponder units be located other than within electrically shielded areas and limit the effective range and/or reliability of signal transmission and/or reception. Such shielding problems are not satisfactorily addressed by attempts to locate the transponder or other signaling device at some secure, but inconspicuous, location on the exterior of a vehicle. In such a location, the signaling device would be exposed to harsh conditions including temperature and humidity extremes, precipitation, icing and an increased risk of damage from physical impact. Locating the device inside the compartment which houses the fuel cap of the vehicle would subject the device to the electric field shielding problems already noted.

Therefore, a need exists for a method and apparatus for transmitting a digital information signal that permit transmission of digital information (e.g., a credit card account number) from substantially electrically shielded environments, such as fuel cap compartments or automobile trunks, thereby facilitating temporary or permanent attachment of such an apparatus within electrically shielded environments, and that provides the flexibility necessary to permit a transmitter employing such a method to be used in vending systems of multiple vendors. A vending system that employs such a method and apparatus would also be an improvement over the prior art.

SUMMARY OF THE INVENTION

In view of the foregoing problems and limitations of the prior art, it is one object of the present invention to provide a transmission system for digital information that permits such digital information to be transmitted from a substantially electrically shielded environment. In one aspect of the present invention, a constant frequency generator generates a constant frequency signal, a phase modulator varies the instantaneous phase of the constant frequency signal based on the digital information, and a resonant circuit including an antenna averages the phase modulated signal to simulate a frequency modulated (FM) signal that includes the digital information. In another aspect of the present invention, the simulated FM signal is transmitted from the antenna primarily via a magnetic field at a carrier frequency of about ten kilohertz or less, thereby enabling the transmission of the digital information from an electrically shielded environment, such as from inside the trunk of an automobile. In a further aspect of the present invention, the phase modulator varies the instantaneous phase of the constant frequency signal by transitioning the constant frequency signal through at least two phases during any one bit transmission period to facilitate detection of the digital information using very low cost small scale integrated (SSI) circuits.

It is another object of the present invention to provide a product vending system in which the aforesaid method and apparatus may be utilized. The product vending system preferably includes a card reading device that, in response to obtaining billing information for a consumer to be charged for the product, provides the billing information to a creditor of the consumer; a receiver for receiving a radio signal from a transmitter associated with a receptacle for the product; a card reader interface, operably coupled to the receiver and the card reading device, that determines whether the radio signal includes billing information for the consumer to be charged and, in response to determining that the radio signal includes the billing information, converts the billing information received from the receiver into a format compatible with the card reading device and generates a control signal to enable the product dispenser to dispense the product; and a transmitter, operably coupled to the card reader interface, that transmits, responsive to at least one control signal from the card reader interface, at least one interrogation signal that includes a request for the billing information.

It is a further object of the present invention to incorporate a jamming circuit into the product vending system, wherein the jamming circuit is coupled to the card reader interface and transmits a jamming signal to prevent the receiver from receiving the radio signal until at least a portion of the product dispenser is in sufficient proximity to the receptacle to permit reception of the radio signal.

It is yet another object of the present invention to provide a product vending system that utilizes half-duplex radio signaling to dispense a product from a dispenser to a receptacle for the product. Such a product vending system includes a transaction controller that generates control signals to facilitate dispensing of the product from the dispenser; a first transmitter, operably coupled to the transaction controller and forming a part of the dispenser, that transmits an interrogation signal responsive to a control signal from the transaction controller, the interrogation signal including a request for billing information of a consumer to be charged for the product; a first receiver, locatable in a substantially electrically shielded environment that is physically associated with the receptacle, that receives the interrogation signal; a second transmitter, operably coupled to the first receiver, that transmits a radio signal responsive to receipt of the interrogation signal, the radio signal including the billing information; and a second receiver, operably coupled to the transaction controller, that receives the radio signal, demodulates the radio signal to recover the billing information, and provides the billing information to the transaction controller.

These and other objects and advantages of the invention will become apparent to the person of ordinary skill in the art upon review of the following detailed description of a preferred embodiment taken in conjunction with the appended drawings in which like reference numerals designate like items.

BRIEF DESCRIPTION OF THE DRAWINGS

FIG. 8 is a block diagram of a jamming circuit in accordance with a preferred embodiment of the present invention.

FIG. 9 is a logic flow diagram illustrating steps executed by a card reader interface to generate a control signal to enable a vending machine to dispense a product in accordance with a preferred embodiment of the present invention.

DETAILED DESCRIPTION OF A PREFERRED EMBODIMENT

Generally, the present invention encompasses a method and apparatus for transmitting a digital information signal and a vending system incorporating such a method and apparatus. In a preferred embodiment, a signal generator (e.g., an oscillator) generates a constant frequency signal. A phase modulator varies the instantaneous phase of the constant frequency signal to represent digital information, thereby producing a phase modulated signal. A tuned resonant circuit filters and averages the phase modulated signal to produce a simulated FM signal, and transmits the simulated FM signal via its antenna. One business transaction system (e.g., a vending system) incorporates such a transmitter to facilitate transmission of billing information from a device locatable within a substantially electrically shielded environment. Another business transaction system (e.g., a vending system, a material tracking system, or a highway toll system) preferably incorporates such a transmitter to facilitate half duplex transmission of digital information regardless of whether or not the digital information is transmitted from a device located within a substantially electrically shielded environment. By transmitting digital information in this manner and utilizing such a transmitter in a vending system, the present invention permits mounting of the transmitter in a location where the transmitter may be hidden from view and is relatively physically secure from loss or theft, such as within a substantially electrically shielded enclosure (e.g., within the trunk or under the hood of an automobile), while allowing a consumer possessing such a fixed transmitter to engage in cashless business transactions, such as purchasing fuel for his or her vehicle or paying roadway usage fees. Thus, the present invention facilitates cashless and wireless vending transactions without requiring a consumer to carry (and potentially lose or have stolen) any RFID transmitter(s) because the transmitter of the present invention may be secured near a receptacle for a product, such as near the fuel inlet of a vehicle, for any consumer-selectable length of time.

Figure 1:
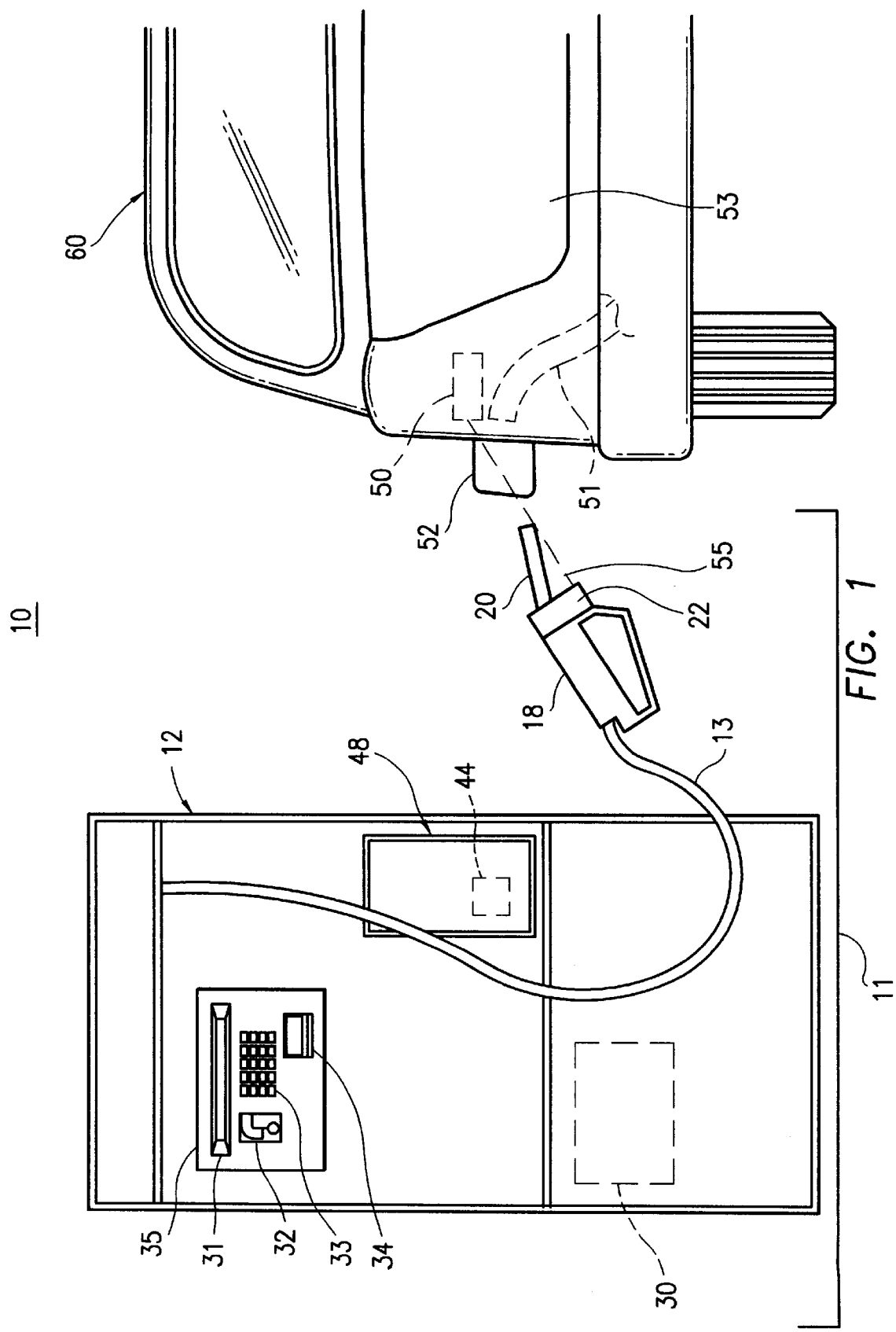
FIG. 1 is a pictorial and block diagram depiction of a product vending system in accordance with a preferred embodiment of the present invention.

The present invention can be more fully understood with reference to FIGS. 1–16. FIG. 1 is a pictorial depiction of a product vending system 10 in accordance with a preferred embodiment of the present invention. The preferred product vending system 10 is a fuel vending system and includes a product vending device 11 that dispenses a product (e.g., fuel) and a receptacle 51 for the product. In the preferred embodiment, the product vending device 11 includes a fuel pumping station 12, at least one hose 13 through which fuel from the fuel pumping station 12 flows, a card reading device 35, a transaction processor 30, and a disablement device 44. The hose 13 includes a dispenser 18 containing a nozzle 20 for directing the fuel into the receptacle 51 and a transceiver 22 (combination of transmitter and receiver) fitted with an antenna (not shown). The transceiver 22 is preferably constructed on a flat, ring-shaped printed circuit (PC) board, which board is mounted on the dispenser 18 inside a sealed cap, such that the nozzle protrudes through the hole in the ring-shaped PC board. The transceiver 22 is hard-wired to the transaction controller 30 via the hose 13 to receive direct current power and signaling instructions from the transaction controller 30. The architecture and operation of the transceiver 22 are discussed in more detail below. The fuel pumping station 12, the hose 13 (less any connection to the transceiver 22), and the dispenser (less the transceiver 22) may suitably comprise one of the "ADVANTAGE™" series of fuel dispensers available from Gilbarco, Inc. of Greensboro, N.C.

The card reading device 35 is connected to the transaction controller 30 (also referred to herein as a card reader interface) and preferably comprises a point of sale terminal, such as those that are commercially available from Gilbarco, Inc. under the trademark "CRIND." The card reading device 35 includes a card receptacle 32 for accepting credit cards, debit cards, and the like, and detecting the respective account information from the inserted card. The card reading device 35 may further include a display 31, a keypad 33, and a currency receptacle 34, although such elements do not form an integral part of the present invention.

The disablement device 44 may take the form of a limit switch or proximity detector that operates to selectively disable the transceiver 22 when the dispenser 18 is located in its nozzle boot 48. In the preferred embodiment, however, the disablement device 44 comprises a jamming circuit that operates under the control of the transaction controller 30 to transmit a jamming signal that prevents the transceiver 22 from receiving any other radio signals when the transceiver 22 is located in the physical vicinity of the disablement device 44. The disablement device 44 is preferably located near the portion of the product vending device 11 that retains the dispenser 18 until a consumer removes the dispenser 18 in anticipation of receiving the product. As shown, the disablement device 44 is preferably located near the nozzle boot 48 in a fuel vending system. In an alternative embodiment, the disablement device 44 might comprise a logic circuit that generates a disable signal when the dispenser 18 is physically disposed within its nozzle boot 48 as sensed by a limit switch or a non-contact proximity detector. That is, instead of transmitting a jamming radio signal to prevent the transceiver 22 from receiving signals, the disablement circuit 44 might disable a portion (e.g., demodulator) of the transceiver 22 through application or removal of a voltage to or from a control section of the portion to be disabled.

The product receptacle 51 may be a stand-alone device, such as a gasoline can, or may form an integral part of a larger apparatus, such as the fuel inlet or fuel tank of a motorized vehicle 60, as shown in FIG. 1. In either case, a transceiver 50 is mounted, or otherwise attached, near (e.g., within one meter of) the receptacle 51 to facilitate radio communication with the transceiver 22 associated with the product dispenser 18 during the transaction. For example, when the receptacle 51 forms part of a motorized vehicle 60, the transceiver 50 may be mounted within a trunk 53 of the vehicle 60 directly above (i.e., adjacent to) the fuel inlet 50. In the alternative, the transceiver may be mounted on the fuel inlet access door 52 or at any other location in the proximity of the receptacle 50.

In the preferred embodiment, the consumer purchases or obtains the transceiver 50 from a vendor or a credit card or debit card issuer and mounts, or otherwise attaches, the transceiver 50 in a desired location (e.g., automobile trunk 53). The transceiver 50 is programmed to electronically store in memory the consumer's credit or debit card account information as well as any other desired billing-related information. Such programming may take place before, at, or after the time of issuance of the transceiver 50 to the consumer. The transceiver 50 is preferably battery-powered (e.g., using a lithium or other suitable battery exhibiting long shelf life and operating life) and packaged inside a sealed or molded plastic case or potting material or another suitable material. Consequently, in the preferred embodiment, the transceiver 50 is self-sufficient and does not require any electrical connections to the vehicle 60. Alternatively, the transceiver 50 may optionally be powered from the power supply associated with vehicle 60, either directly or through a charger coupled to a battery.

In order to program the transceiver 50 with account information, the account information is typically read from the magnetic stripe of a credit card using a conventional reading device. The data on the stripe typically contains a relatively high ratio of redundancy, which includes inefficient character encoding plus a parity bit for each digit (i.e., five bits of data per digit to represent the digits 0–9, which can be ideally represented using 3.32 bits/digit). This redundancy is preferably reduced or eliminated using any suitable data compression technique to compress the account number, the expiration date, and the extra data on track 2 of the magnetic stripe. The compression serves to reduce the number of bits required to be transmitted, and accordingly the transmission time, which prolongs battery life.

Figure 2:
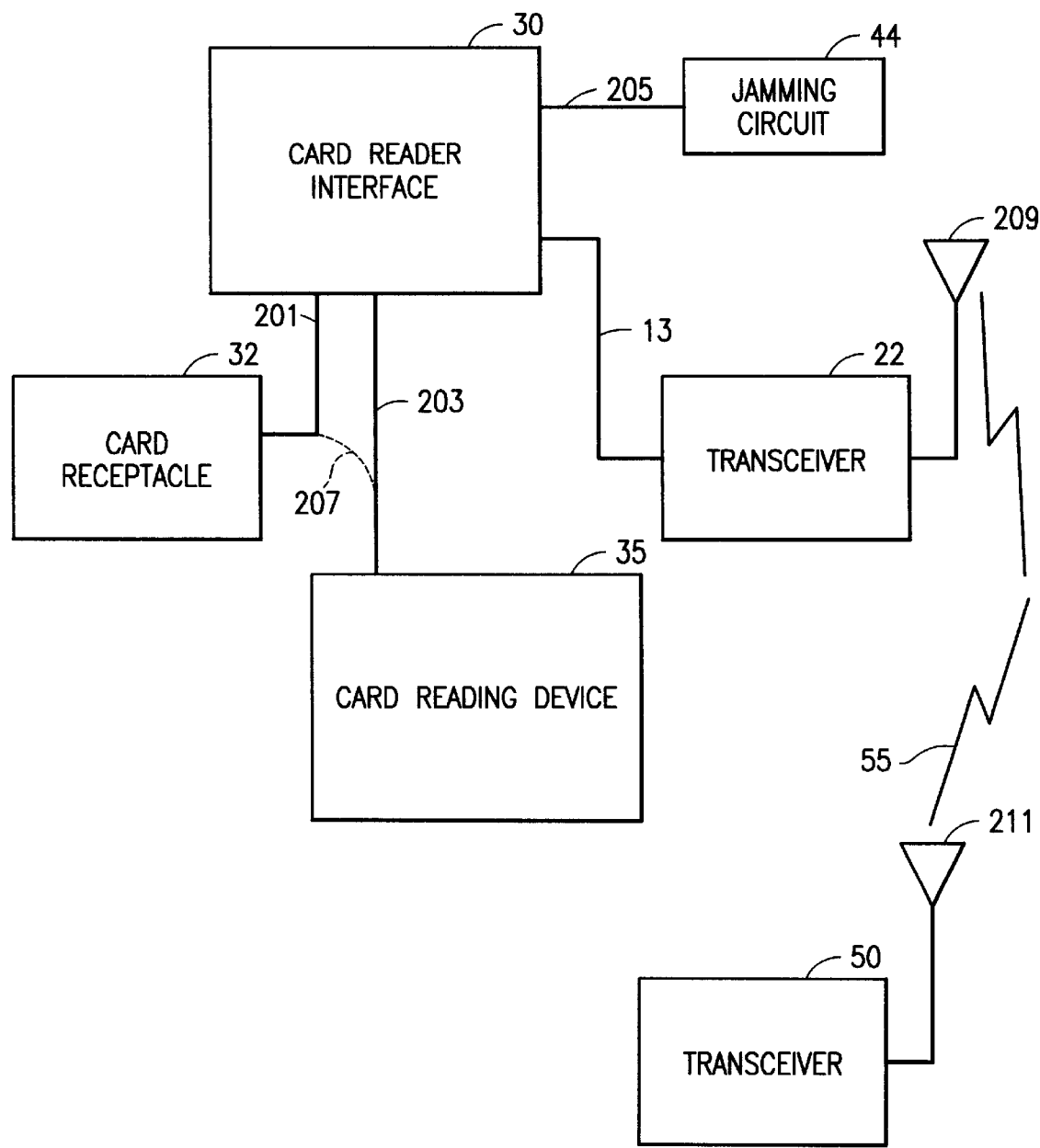
FIG. 2 is a block diagram depiction of the product vending system of FIG. 1.

FIG. 2 is a block diagram depiction of the product vending system 10. As discussed above, the vending system 10 includes the transceivers 22, 50 and their associated antennas 209, 211, the dispenser 118, the hose 13, the card reader interface 30, the card reading device 35, the card receptacle 32, and the jamming circuit 44. Referring to FIGS. 1 and 2, operation of the product vending system 10 occurs substantially as follows in accordance with the present invention.

When a consumer desires to obtain a product, such as fuel, the consumer opens the fuel inlet access door 52, removes the fuel inlet cap (not shown), and removes the dispenser 18 from its retainer 48. In anticipation of a future fuel dispensing transaction, the card reader interface/transaction controller 30 periodically instructs the dispenser transceiver 22, preferably via a bi-directional data line connected to the hose 13, to determine whether a receptacle transceiver 50 is in sufficient proximity to the dispenser 18 to begin such a transaction. Depending on the type of fuel vending device 11, multiple dispensers might be employed (e.g., one dispenser for each grade of gasoline). Accordingly, the card reader interface 30 periodically instructs each connected dispenser transceiver 22 to determine whether a receptacle 50 is present. In the preferred embodiment, each dispenser transceiver 22 is instructed or polled once every N times 170 milliseconds to determine the presence of a receptacle transceiver 50, where N is the number of dispensers 18 that happen to be supported by the card reader interface 30.

When instructed to determine the presence of a receptacle transceiver 50, the dispenser transceiver 22 first transmits an interrogation signal requesting billing information for a consumer to be charged for the product. After transmitting the interrogation signal, the dispenser transceiver 22 receives signals for a predetermined time duration (e.g., a time duration associated with receiving eight bits) in an attempt to receive an acknowledgment of the interrogation signal. Once the receive cycle of a poll has completed, the received information (e.g., bits), if any, is correlated with the pre-established acknowledgment sequence in accordance with known techniques to determine whether a receptacle transceiver 50 is present. In the preferred embodiment, the received bits are also correlated with a jamming signal transmitted by the jamming circuit 44 during the polling cycle of the particular dispenser transceiver 22. The jamming signal comprises a frequency shift keying (FSK) encoded signal (jamming code 205) having a bit sequence that does not resemble a valid receptacle transceiver 50 response. The jamming code 205 is generated by the card reader interface 30 and is provided to the jamming circuit 44 for transmission. When bits received by the dispenser transceiver 22 correlate to the jamming code 205, the card reader interface 30 presumes that the dispenser 18 is still in its retainer 48 and no receptacle transceiver 50 is present. Thus, until an interrogation signal acknowledgment from the receptacle transceiver 50 is of a sufficient signal strength to dominate the jamming signal, the dispenser transceiver 22 will continue receiving the jamming signal and no dispensing will take place. Once the card reader interface 30 determines that a receptacle transceiver 50 is present, the card reader interface 30 preferably terminates the jamming code 207 temporarily until the transaction is completed.

Analogous to the preferred intermittent transmission of interrogation signals by the dispenser transceiver 22, the receptacle transceiver 50 preferably enables its receiver portion intermittently to receive interrogation signals. In the preferred embodiment, the receiver portion of the transceiver 50 is enabled intermittently at a duty cycle of approximately eighteen percent (18%) to save battery current.

When enabled, the receiver portion of the receptacle transceiver 50 receives signals and correlates the received signals with a predetermined interrogation signal sequence to determine whether an interrogation signal has been received. In the preferred embodiment, the receiver correlation circuit is designed such that the first three bits at the initiation of receive enable are used to seed a three bit maximal length sequence (MLS) generator. The MLS generator then generates the next bit in the sequence, which for proper correlation exactly matches the received bit. The MLS generation process continues until either the end of an interrogation sequence, as indicated by appropriate stop bits, or an inequality occurs. Once an inequality occurs or an end of interrogation is detected, the receiver portion of the receptacle transceiver 50 is disabled, sending the receptacle transceiver 50 to a low current drain state to conserve battery power and extend battery life.

In a purely random environment, where the probability of encountering a binary "zero" and a binary "one" are equally weighted, the average receiver enable duty cycle is given by the following equation:

$$\text{Duty cycle} = 0.5*4/22 + 0.25*5/22 + 0.125*6/22 + \ldots$$

which yields an effective receiver duty cycle of 22.5 percent. Assuming that the disabled receiver draws negligible current, the operational life of the battery used to power the receptacle transceiver 50 can be extended by four times its continuous duty operational life. In the preferred embodiment, the periodic transmissions of interrogation signals by the dispenser transceiver 22 and the periodic enabling of the receiver portion of the receptacle transceiver 50 are appropriately phased, such that a receptacle transceiver 50 in a coverage area of the dispenser transceiver 22 will be detected by the dispenser transceiver 22 within one complete card reader interface polling cycle.

Thus, prior to and during the consumer's removal of the dispenser 18 from its retainer 48, the above-described intermittent interrogation signal transmissions occur without the consumer's knowledge. Once the dispenser transceiver 22 is positioned sufficiently close to the receptacle transceiver 50 to permit reception of the interrogation signal and the receptacle transceiver 50 acknowledges reception of the interrogation signal during a polling cycle of the dispenser transceiver 22, the receptacle transceiver 50 transmits billing information (e.g., a credit card or debit card account number, expiration date, creditor identification, or any other information stored by the issuer of the charge or debit account) to the dispenser transceiver 22 in the form of a radio signal 55. For security purposes, the billing information is preferably encrypted prior to transmission using any suitable encryption scheme, such as a common key scheme, of which many types offering excellent levels of security are well known to those skilled in the art. In addition, in the preferred embodiment, the receptacle transceiver 50 transmits the interrogation signal acknowledgment and the billing information via a magnetic field at a frequency of 8.192 kilohertz (kHz), in the manner described in U.S. patent application Ser. No. 08/956,732, which is hereby expressly incorporated herein by reference in its entirety to form part of the present disclosure. By using low frequency magnetic coupling to convey information instead of high frequency electromagnetic coupling, the receptacle transceiver 50 can be located within substantially electrically shielded environments physically associated with the receptacle 51 for the product, such as automobile trunks or automobile hoods, without substantially affecting transmission or reception.

Upon receiving the radio signal 55, the dispenser transceiver 22 demodulates, decodes, and decrypts the radio signal 55 to extract the digital information, if any, contained therein and provides the digital information to the card reader interface 30. The card reader interface 30 determines whether the digital information represents valid billing information for a consumer to be charged for the product. To make this determination, the card reader interface 30 performs some initial processing itself, such as executing one or more known algorithms to test for a valid credit or debit card and examining the digits corresponding to the expiration date of the card to determine whether the expiration date associated with the billing information has passed. Upon completing this initial processing, the card reader interface 30 forwards the billing information to the appropriate creditor for authorization of the transaction. To accomplish such forwarding of the billing information, the card reader interface 30 emulates a credit or debit card swipe in the card receptacle 32 by converting the billing information into a format compatible with the card reading device 35 and providing the converted billing information 203 to the card reading device 35 on the same data bus as corresponding information is typically provided after a credit or debit card is swiped in the card receptacle 32. That is, the card reader interface 30 temporarily seizes the connection 207 between the card receptacle 32, exposed externally at the fuel vending device 11, and the internal electronics of the card reading device 35. The card reader interface 30 emulates the sequence of clock and data bits 201 ordinarily produced by a manual swipe of a credit or debit card. The internal interface electronic module of the card reading device 35, unaware that the transaction was initiated by the card reader interface 30, forwards the account information to a remotely-located Point of Sale (POS) computer (not shown), which responds with authorization approval or denial. Therefore, the present invention can be readily installed in existing fuel vending devices by simply installing the card reader interface 30 and the jamming circuit 44, and by connecting the card reader interface 30 in series with the data bus ordinarily connecting the card receptacle 32 to the card reading device 35.

Once the POS computer responds via the card reading device 35 authorizing the transaction, the card reader interface 30 releases the card receptacle control lines, allowing normal operation of the card receptacle and thereby effectively generating a control signal to enable the dispenser 18 to dispense the product. Upon completion of the dispensing operation, the POS computer debits the account identified in the billing information for the amount of the product purchase in accordance with known techniques.

As described above, the preferred embodiment of the present invention provides a vending system in which half-duplex transceivers associated with a product dispenser and a receptacle for the product are employed to facilitate point-of-sale billing without requiring any action by the consumer other than the consumer's normal positioning of the dispenser in or near the receptacle. By contrast, prior art fuel vending devices, such as those incorporating "SPEED-PASS" technology, require the consumer to carry a transponder containing the billing information and to position the transponder near a receiver on the fuel pumping station prior to removing the dispenser from its retainer and positioning the dispenser in or near the receptacle. Thus, the present invention eliminates the need to carry yet another device containing account information which can be lost or stolen at any time. In addition, the present invention utilizes efficient half-duplex transceivers to efficiently transmit billing information from the receptacle transceiver only when requested for it by the dispenser transceiver, thereby eliminating the need for the battery-operated receptacle transceiver to continuously transmit information and consume battery power. Still further, since only a common encryption key need be made available to other vendors, when encryption is used, the present invention can readily be implemented on a universally acceptable basis so that consumers are not limited to use of the system only for purchases from a particular vendor, in sharp contrast to prior art systems, such as the "SPEEDPASS" system.

Although described above with reference to half-duplex operation of the transceivers 22, 50, the present invention is also applicable in a simplex communication environment. In such a system, a transmitter is mounted in the location of the receptacle transceiver 50 and a receiver is mounted in the location of the dispenser transceiver 22. The transmitter continually or periodically transmits the billing information in the form of a radio signal. The receiver continually or periodically receives signals and forwards the digital information contained in such signals to the card reader interface 30. However, for the reasons discussed above, simplex operation may be less favorable than half-duplex operation.

In addition to its application to the dispensing of fuel or any other product, the radio signal transmission method and apparatus of the present invention also has application to the tracking of inventory or to the transaction of other business, such as payment of road usage fees, in a wireless manner. In such non-product dispensing applications, the transmission technique employed in the preferred embodiment of the receptacle transceiver 50 and described in more detail below with respect to FIGS. 3–5 and 10 may be utilized to permit wireless transmission of billing information or inventory tracking numbers from battery-powered transceivers located in substantially electrically shielded enclosures, such as under automobile hoods, inside automobile trunks, or on medical, office or industrial equipment, where tracking assets is crucial, but where existing RF systems are unreliable due to electric field shielding effects.

Figure 3:
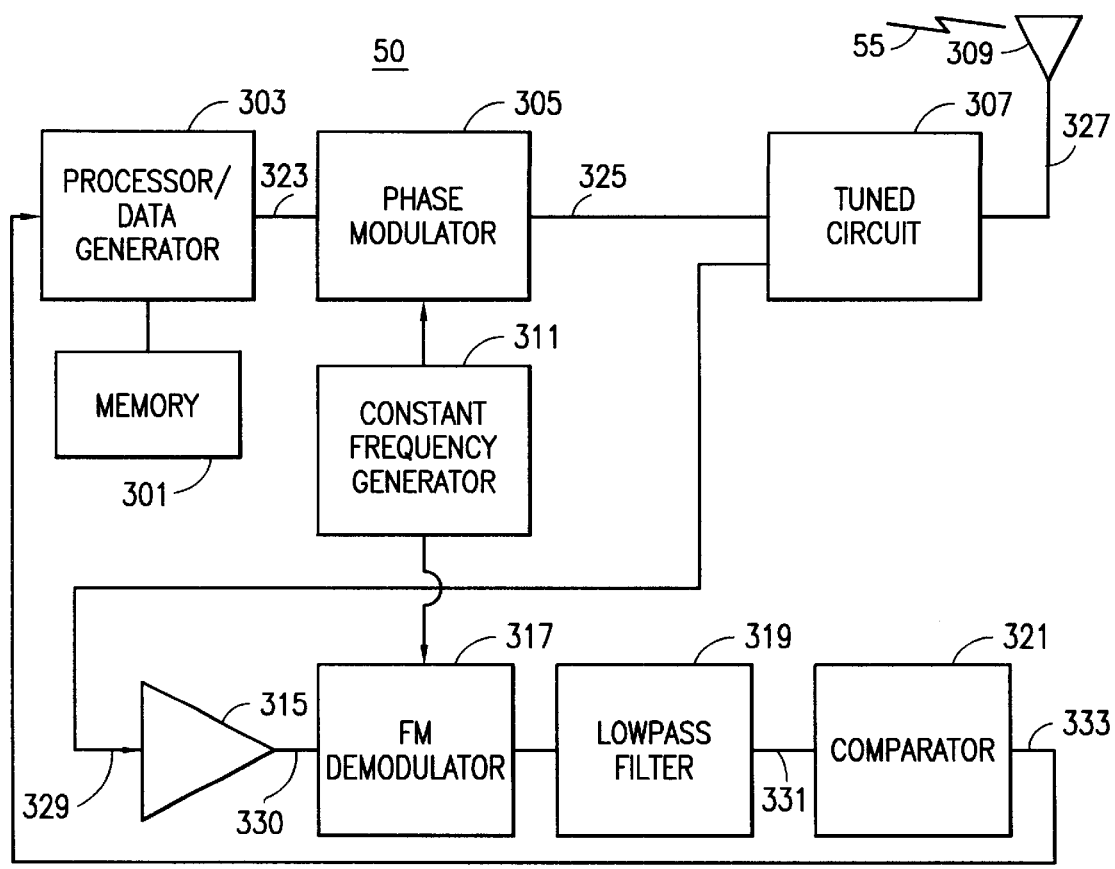
FIG. 3 is a block diagram depiction of a preferred transceiver for the product vending system of FIG. 1.

FIG. 3 is a block diagram depiction of the preferred transceiver 50 for use near the fuel receptacle 51 in the product vending system 10 of FIG. 1. The transceiver 50 preferably operates in a half-duplex mode and includes a memory device 301 for storing digital information, such as billing information, a processor/data generator 303, a phase modulator 305, a tuned circuit 307, an antenna 309, a constant frequency generator 311, an amplifier 315, an FM demodulator 317, a lowpass filter 319, and a comparator 321. The memory device 301 preferably comprises read/write random access memory (RAM) that forms part of the processor/data generator 303. The preferred implementation of the remaining elements of the transceiver 50 are described in detail below with respect to the schematic depiction of such elements provided in FIG. 5.

Figure 4:
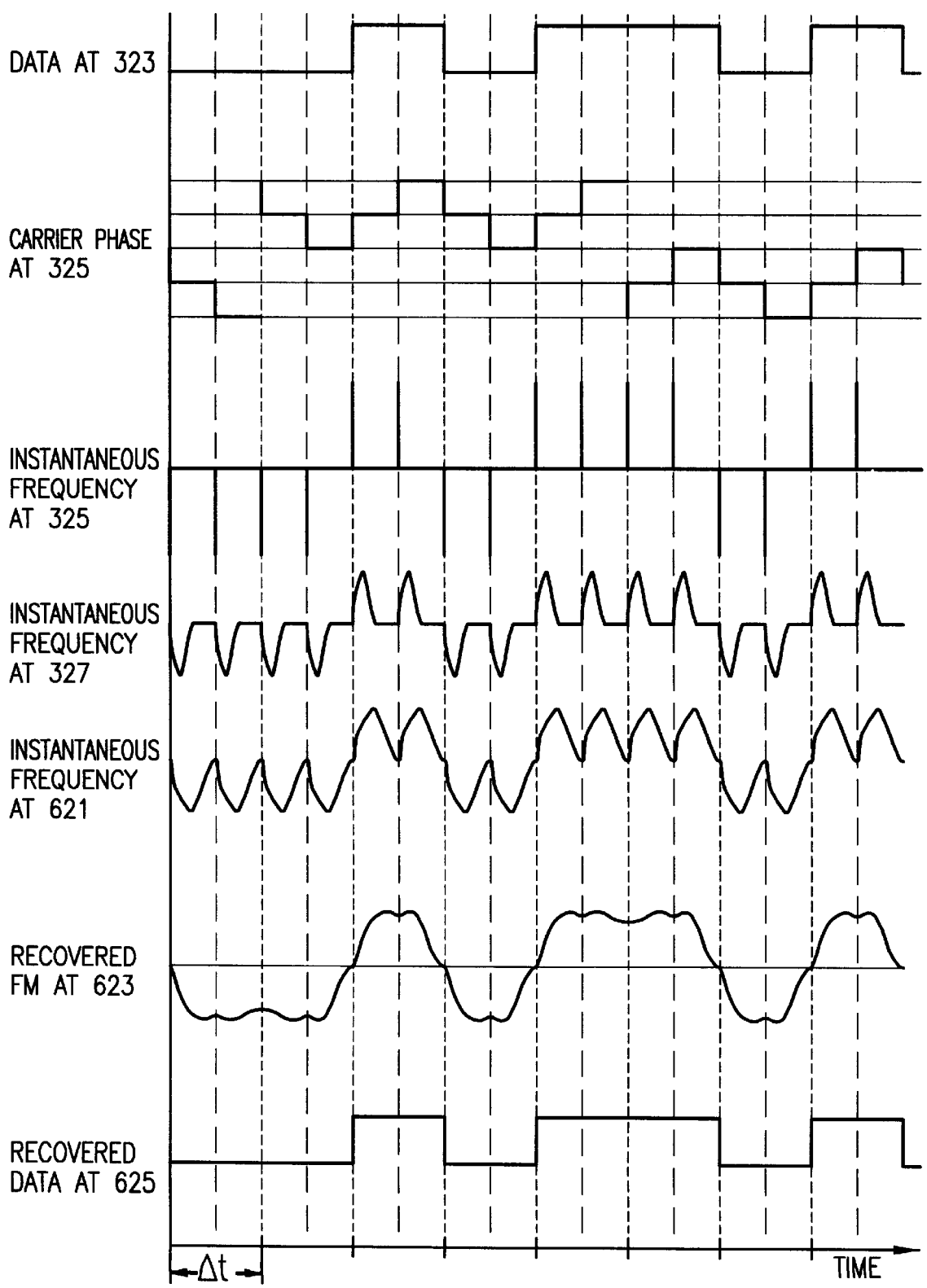
FIG. 4 is a timing diagram of expanded time scale illustrating generation of a simulated FM signal by a transmitter portion of the transceiver of FIG. 3 and recovery of such simulated FM signal by a receiver portion of the transceiver of FIG. 3.

Referring now to FIGS. 3 and 4, operation of the preferred receptacle transceiver 50 occurs substantially as follows in accordance with the present invention. During a dispenser transceiver polling cycle, the antenna 309 receives an interrogation signal via a radio channel 55 and passes the signal to the tuned circuit 307 for filtering and averaging. In the preferred embodiment, the interrogation signal is modulated in the dispenser transceiver 22 using FSK modulation. FSK modulation is preferably used in the dispenser transceiver 22 due to its ease of implementation in a high clock frequency integrated circuit (IC) and because the dispenser transceiver can be powered from a source other than a battery, such as a direct current source generated within the product vending device. Thus, the power requirements of the IC used to generate the FSK modulated signal are of less of a concern in the dispenser transceiver than are such power requirements in the battery-powered receptacle transceiver 50. By contrast, the preferred receptacle transceiver 50 utilizes low power, low clock frequency ICs, flip-flops, and NAND gates to create a simulated frequency modulated (FM) signal, as described below.

During receive mode, the phase modulator 305 and any other transmit amplifiers, if used, present a high impedance (e.g., greater than ten times the input impedance of the receiver amplifier 315) to the received signal. Consequently, the tuned circuit 307 passes the averaged signal 329 to the receive path of the transceiver 50. The averaged signal 329 is amplified and leveled by the amplifier 315 to produce a constant envelope signal 330 and the constant envelope signal is provided to the FM demodulator 317. As is well known, an FM demodulator may be employed to demodulate an FSK-modulated signal because FSK modulation does not impart any information in the amplitude of the transmitted signal and the data may be recovered without resolving the actual phase of the recovered signal.

Upon receiving the constant envelope signal 330, the FM demodulator 317 recovers an analog representation of the transmitted bits by mixing the constant envelope signal 330 with a time-delayed version of itself in accordance with known delay discrimination techniques. In the preferred embodiment, the frequency of the received signal 329 is approximately 8.192 kHz and equals the frequency of the signal generated by the constant frequency generator 311. A frequency of about 10 kHz or less is selected to permit practical implementation of an antenna 309 that conveys and receives signals primarily via a magnetic field and, therefore, facilitates transmission of signals from within substantially electrically shielded enclosures. Such an antenna 309 is described in detail in commonly-assigned U.S. patent application Ser. No. 08/956,732, which is expressly incorporated herein by reference in its entirety to form part of the present disclosure.

The FM demodulator 317 provides the analog representation to the lowpass filter 319 for filtering and frequency spreading. The filtered representation is provided to the comparator 321, which compares the filtered representation with a preset analog signal to detect the transmitted bits and ultimately recover the transmitted data 333 (e.g., request for billing information). The request for billing information is then provided to the processor 303.

Upon recovering a bit sequence that corresponds to a request for billing information, the receptacle transceiver 50 begins the sequence of steps associated with transmitting the billing information. The processor/data generator 303 retrieves the data 323 corresponding to the billing information from the memory device 301 and instructs the phase modulator 305 to vary a phase of the constant frequency signal generated by the constant frequency generator 311 to produce a phase modulated signal 325 that represents the data. The microcontroller source code associated with operation of the processor 303, less any code related to encryption or decryption, is contained in the attached microfiche appendix.

In the preferred embodiment, the phase modulator 305 has four selectable phases (0 degrees, 90 degrees, 180 degrees, and 270 degrees) and transitions through two phases selected by the processor 303 during each bit transmission period to represent a particular bit of the data 323. It is well known that frequency modulation is mathematically equivalent to continuously modifying the instantaneous phase of a carrier frequency (fc), yielding the mathematical result for the instantaneous frequency:

$$f(t) = f_c + 1/(2\pi) * d\Phi/dt$$

where $\Phi$ is the instantaneous phase of the carrier frequency and t is time.

Thus, if, for example, one wished to represent a binary "one," which in the FM case might be represented by an instantaneous frequency greater than the carrier frequency, an equivalent waveform can be generated by continuously and smoothly adding a positive offset to the phase of the carrier frequency. Similarly, a binary "zero" could be represented by continuously and smoothly subtracting a negative offset to the phase of the carrier frequency. Therefore, in this case, if one considers a phasor diagram with 0 degrees on the positive X-axis, 90 degrees on the positive Y-axis, 180 degrees on the negative X-axis, and 270 degrees on the negative Y-axis, a binary "one" might be denoted by a counterclockwise rotation of the phasor; whereas, a binary "zero" might be denoted by a clockwise rotation of the phasor, wherein the carrier frequency is denoted by no rotation. In an analogous manner, a binary "one" could be represented by an instantaneous frequency less than the carrier frequency and a binary "zero" could be represented by an instantaneous frequency greater than the carrier frequency. Consequently, in this case, a binary "one" might be denoted by a clockwise rotation of the phasor; whereas, a binary "zero" might be denoted by a counterclockwise rotation of the phasor. Therefore, instantaneous phase transitions applied by the phase modulator 305 result in a phase modulated signal 325 with instantaneous frequency changes that correspond to the bits of data 323. The number of phase transitions utilized to represent a particular bit is related to the average frequency deviation of the modulated signal.

As noted above, the processor 303 preferably instructs the phase modulator 305 to introduce two phase transitions per bit transmission period. However, because phase selection is instantaneous, each bit is represented by two abrupt 90-degree phase transitions, either clockwise or counterclockwise, instead of a smooth rotation of the phase of the constant frequency signal produced by the constant frequency generator 311. To account for such abrupt phase transitions, the phase modulated signal 325 is filtered and averaged by the tuned circuit 307 to produce a simulated FM signal 327. That is, the output of the tuned circuit 307 is not a true FM signal, but rather approximates an FM signal waveform. In the preferred embodiment, additional filtering and averaging occurs in the dispenser transceiver 22 as described below to produce a signal that more closely approximates an FM signal prior to demodulation. However, in an alternative embodiment, all such filtering and averaging may be included in the transmit portion of the receptacle transceiver 50.

Further understanding of the aforesaid phase modulation approach can be gained by referring to FIG. 4, which is a timing diagram of expanded time scale illustrating generation and recovery of the simulated FM signal. Starting at the top of FIG. 4, the first timing diagram depicts exemplary data 323 retrieved from the memory device 303. In this example, the data consists of the bit sequence "00101101". Each bit has a respective bit transmission time of Δt.

The second diagram depicts the preferred phase transitions of the constant or carrier frequency signal introduced by the phase modulator 305 to represent the data 323 in response to instruction from the processor 303. Thus, the second diagram illustrates the phase of the phase modulated signal 325 during each bit transmission period. As shown by the diagram, a binary "zero" is represented by two clockwise phase transitions (e.g., from 0 degrees to 270 degrees and then from 270 degrees to 180 degrees); whereas a binary "one" is represented by two counterclockwise phase transitions (e.g., from 180 degrees to 270 degrees and then from 270 degrees to 0 degrees).

The instantaneous frequency of the phase modulated signal 325 at each phase transition is depicted in the third diagram. The instantaneous frequency can be shown mathematically to be an impulse of either positive or negative polarity corresponding to a positive or negative phase transition. However, such a waveform of impulses has little value as an FM waveform because the FM component is too narrow to measure accurately. Thus, the FM impulses must be broadened or spread in time to be effective.

Broadening of the instantaneous frequency waveform is depicted in the fourth diagram through illustration of the instantaneous frequency of the tuned circuit output signal 327. The bandpass response of the tuned circuit 307 spreads the FM impulses in time, thereby producing a simulated FM signal that is detectable. Additional filtering further spreads the FM impulses in time as depicted in the fifth diagram. As noted above and discussed in more detail below, the additional filtering is preferably provided in the dispenser transceiver 22, although such filtering could alternatively be added to the transmit portion of the receptacle transceiver 50. The two remaining diagrams depict the recovered FM and data, and will be discussed in more detail below with respect to FIG. 6.

Figure 5A:
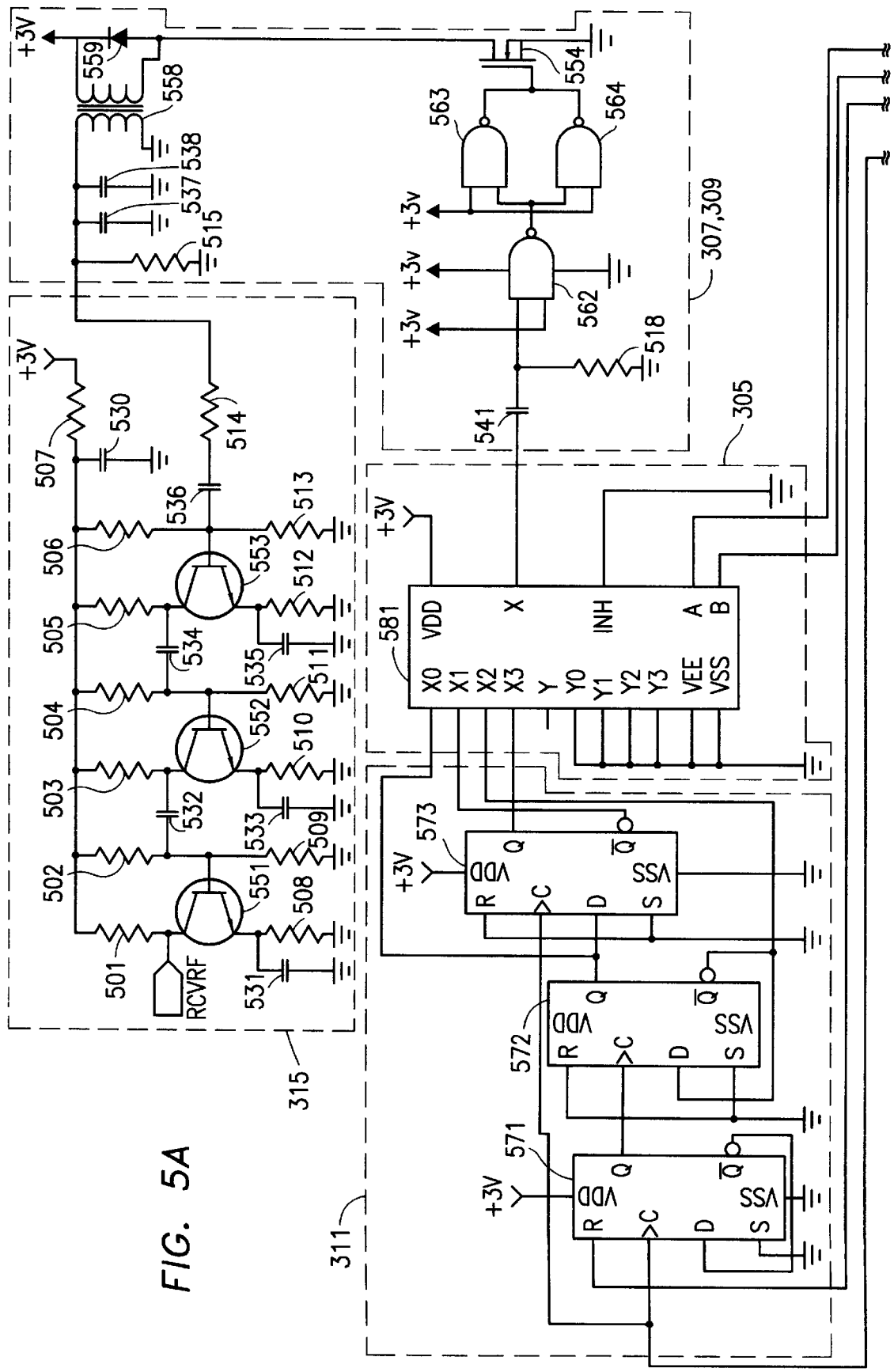
FIGS. 5A–5C together form a circuit schematic of a preferred embodiment of the transceiver of FIG. 3.
Figure 5B:
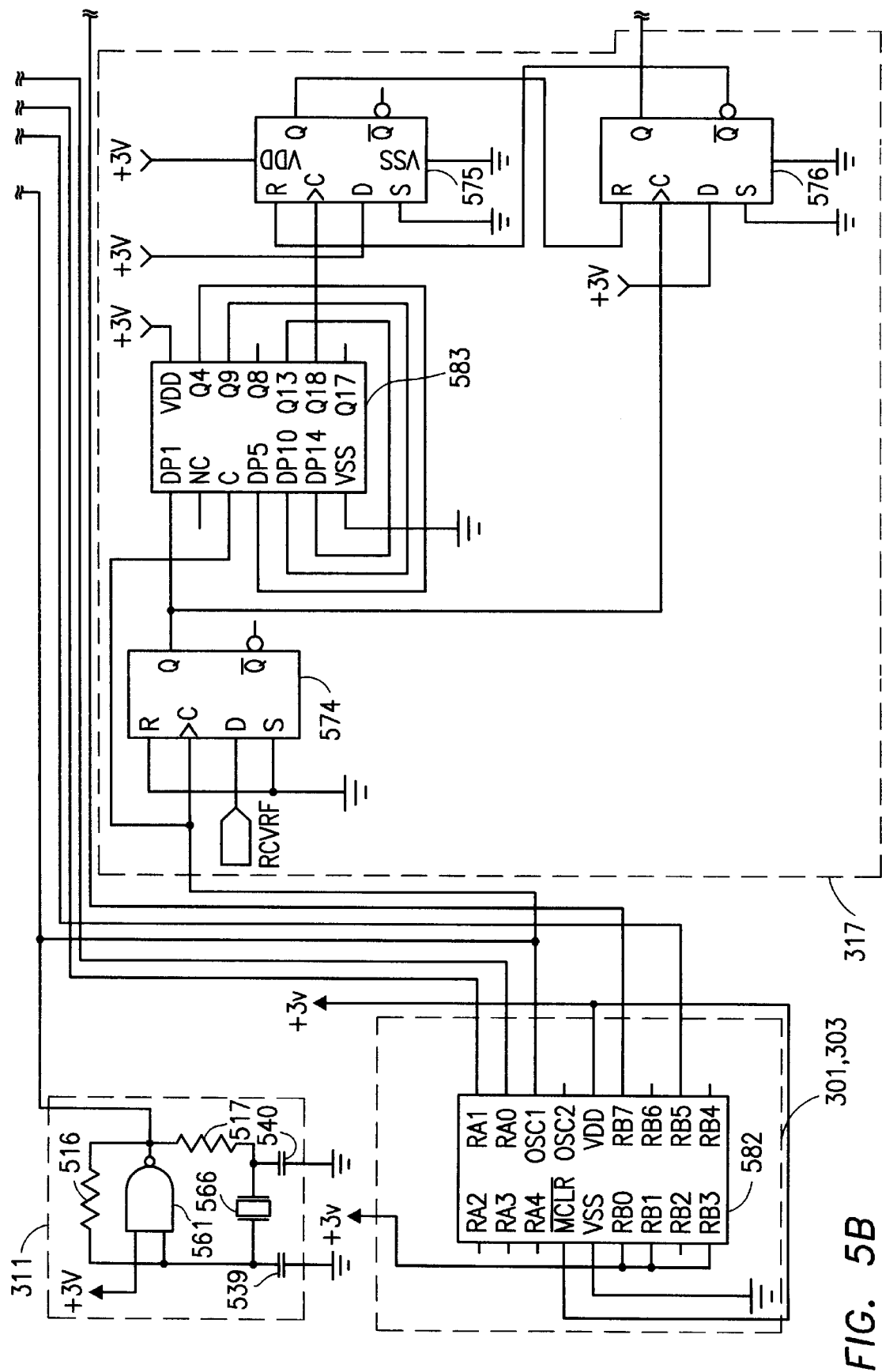
Figure 5C:
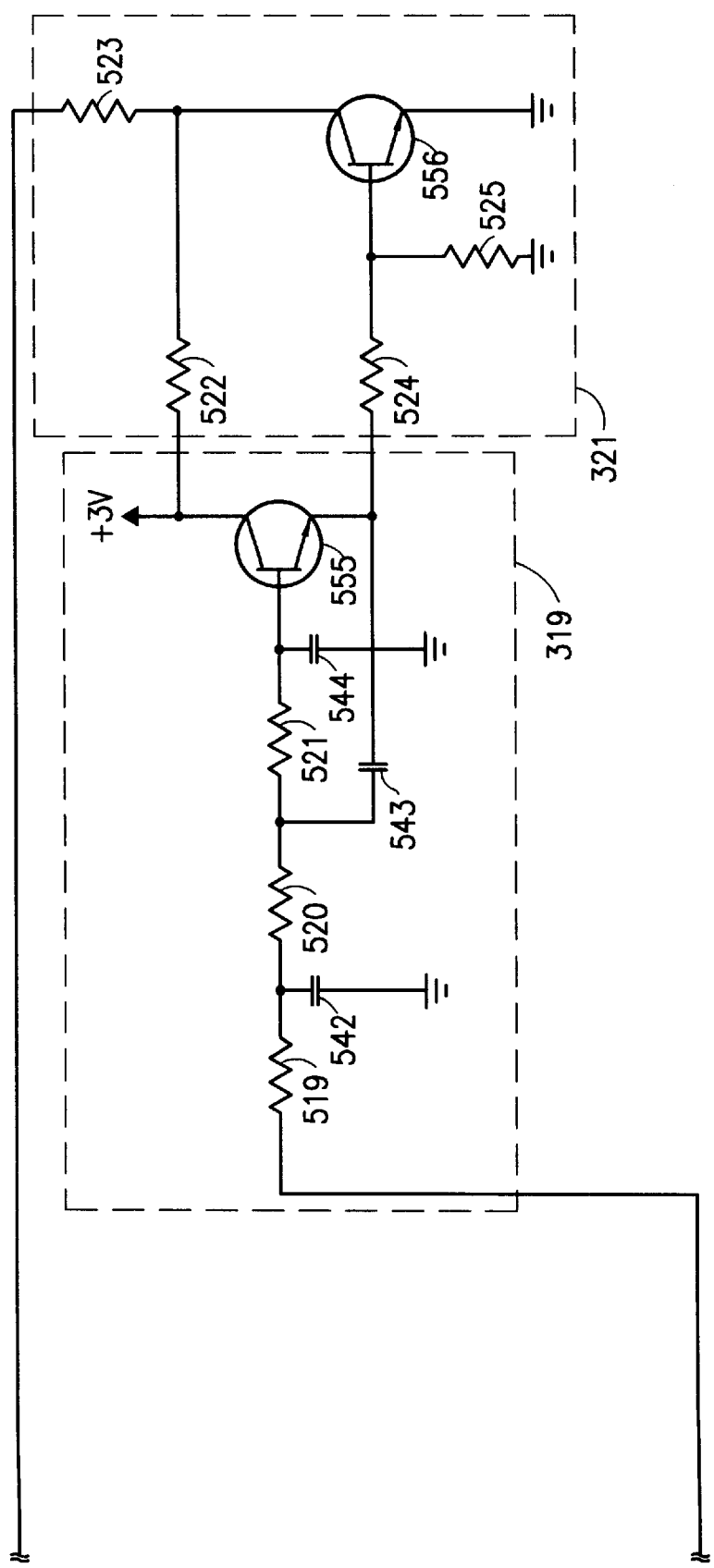

FIGS. 5A–5C together form a circuit schematic of a preferred embodiment of the receptacle transceiver 50 of FIG. 3. The preferred transceiver comprises a plurality of resistors 501–525, a plurality of capacitors 530–544, a plurality of transistors 551–556, a transformer 558, a diode 559, a plurality of NAND gates 561–564, a piezoelectric crystal 566, a plurality of flip-flops 571–576, a microcontroller 582, and two microcircuits 581, 583. The microcontroller 582 functions as the processor 303 and the memory device 301. The phase modulator 305 comprises microcircuit 581, which is a data selector that selects a single clock phase for transmission, according to a prescribed format, in an algorithm contained within the microcontroller 582.

The constant frequency generator 311 comprises an oscillator and the circuit including flip-flops 571–573. The oscillator is formed using a conventional tuning fork style piezoelectric crystal 566, two resistors 516, 517, proper loading capacitors 539, 540, and a conventional oscillator gate 561 as is well known in microelectronic designs. The oscillator provides a uniform clock waveform at 32.768 kHz having exceptional accuracy due to the crystal 566. The clock and integer subharmonic frequencies are utilized to provide the timebase for receptacle transceiver timing, synchronous clocking of processor state machines, and stimulus for a timer circuit internal to the microcontroller 582. The flip-flops 571–573 synthesize four clock phases of 8.192 kHz, which are applied for selection by the phase modulator 305.

The tuned circuit 307 comprises a resonant circuit and a driver circuit. The resonant circuit is formed from resistor 515, capacitors 537 and 538, transformer 558, and diode 559. The resonant circuit includes the antenna 309, which is formed by the transformer 558. The driver circuit comprises gates 562–564, metal oxide semiconductor (MOS) field effect transistor 554, resistor 518, and capacitor 541. Details of the operation of the tuned circuit 307 can be found in U.S. patent application Ser. No. 08/956,732, which is incorporated herein by reference.

The receiver amplifier 315 is formed from the combination of resistors 501–514, capacitors 530–536, and transistors 551–553. The FM demodulator 317 receives its input from the receiver amplifier 315 (see RCVRF port) and is formed using very inexpensive small scale integrated (SSI) microcircuits. The devices are low power, low cost complimentary MOS devices, which enable the invention to be implemented conveniently and at low cost. Thus, as shown, the FM demodulator 317 includes flip-flops 574–576 and microcircuit 583.

The receiver lowpass filter 319 constitutes an active filter comprising resistors 519–521, capacitors 542–544, and transistor 555. Finally, the comparator 321 includes resistors 522–525 and transistor 556. Table 1 below is a parts listing for the transceiver 50 of FIGS. 5A–5C. In the preferred embodiment, all elements of the transceiver 50, with the exception of the crystal 566 and all the elements forming the receiver amplifier 315, the tuned circuit 307, and the antenna 309, are implemented within an application specific integrated circuit (ASIC).

TABLE 1

| Reference Numeral(s) | Description | Quantity | Manufacturer | Manufacturer's Part Number |
|---|---|---|---|---|
| 516 | 10 MΩ resistor | 1 | Panasonic Industrial Co. (Div. Of Matsushita Electric Corp. of America) (Secaucus, NY). | ERJ-6GEYJ-106 |
| 517 | 470 kΩ resistor | 1 | Panasonic Industrial Co. (Div. Of Matsushita Electric Corp. of America) (Secaucus, NY). | ERJ-6GEYJ-474 |
| 509, 511, 513, 522 | 1 MΩ resistor | 4 | Panasonic Industrial Co. (Div. Of Matsushita Electric Corp. of America) (Secaucus, NY). | ERJ-6GEYJ-105 |
| 518 | 220 kΩ resistor | 1 | Panasonic Industrial Co. (Div. Of Matsushita Electric Corp. of America) (Secaucus, NY). | ERJ-6GEYJ-224 |
| 515 | 22 kΩ resistor | 1 | Panasonic Industrial Co. (Div. Of Matsushita Electric Corp. of America) (Secaucus, NY). | ERJ-6GEYJ-223 |
| 514 | 10 kΩ resistor | 1 | Panasonic Industrial Co. (Div. Of Matsushita Electric Corp. of America) (Secaucus, NY). | ERJ-6GEYJ-103 |
| 502, 504, 506 | 2 MΩ resistor | 3 | Panasonic Industrial Co. (Div. Of Matsushita Electric Corp. of America) (Secaucus, NY). | ERJ-6GEYJ-205 |
| 507 | 1 kΩ resistor | 1 | Panasonic Industrial Co. (Div. Of Matsushita Electric Corp. of America) (Secaucus, NY). | ERJ-6GEYJ-102 |
| 512 | 82 kΩ resistor | 1 | Panasonic Industrial Co. (Div. Of Matsushita Electric Corp. of America) (Secaucus, NY). | ERJ-6GEYJ-823 |
| 505 | 200 kΩ resistor | 1 | Panasonic Industrial Co. (Div. Of Matsushita Electric Corp. of America) (Secaucus, NY). | ERJ-6GEYJ-204 |
| 508, 510 | 150 kΩ resistor | 2 | Panasonic Industrial Co. (Div. Of Matsushita Electric Corp. of America) (Secaucus, NY). | ERJ-6GEYJ-154 |
| 501, 503 | 430 kΩ resistor | 2 | Panasonic Industrial Co. (Div. Of Matsushita Electric Corp. of America) (Secaucus, NY). | ERJ-6GEYJ-434 |
| 519–521 | 330 kΩ resistor | 3 | Panasonic Industrial Co. (Div. Of Matsushita Electric Corp. of America) (Secaucus, NY). | ERJ-6GEYJ-334 |
| 524 | 510 kΩ resistor | 1 | Panasonic Industrial Co. (Div. Of Matsushita Electric Corp. of America) (Secaucus, NY). | ERJ-6GEYJ-514 |
| 525 | 750 kΩ resistor | 1 | Panasonic Industrial Co. (Div. Of Matsushita Electric Corp. of America) (Secaucus, NY). | ERJ-6GEYJ-754 |
| 523 | 22 kΩ resistor | 1 | Panasonic Industrial Co. (Div. Of Matsushita Electric Corp. of America) (Secaucus, NY). | ERJ-6GEYJ-223 |
| 539 | 5 pF capacitor | 1 | Surface Mountable Electronic Components, Inc. (Austin, TX) | MCCE5R1D-2NO |
| 540 | 20 pF capacitor | 1 | Surface Mountable Electronic Components, Inc. (Austin, TX) | MCCE200J-2NO |
| 541 | 68 pF capacitor | 1 | Surface Mountable Electronic Components, Inc. (Austin, TX) | MCCE680J-2NO |
| 531, 533, 535 | 0.1 μF capacitor | 3 | Surface Mountable Electronic Components, Inc. (Austin, TX) | MCCE104M-2NU |
| 538 | 0.01 μF capacitor | 1 | NIC Components Corp. (Amityville, NY) | NSPC103J50-TRB2 |
| 537 | 3300 pF capacitor | 1 | Surface Mountable Electronic Components, Inc. (Austin, TX) | MCCE332J-3NO |
| 532, 534, 536 | 1000 pF capacitor | 3 | Surface Mountable Electronic Components, Inc. (Austin, TX) | MCCE102-K2NR |
| 530 | 10 μF capacitor | 1 | Panasonic Industrial Co. (Div. Of Matsushita Electric Corp. of America) (Secaucus, NY). | ECS-TOJY-106R |
| 542 | 6800 pF capacitor | 1 | Surface Mountable Electronic Components, Inc. (Austin, TX) | MCCE682-K2NR |
| 543 | 0.01 μF capacitor | 1 | Surface Mountable Electronic Components, Inc. (Austin, TX) | MCCE103-K2NR |
| 544 | 1800 pF capacitor | 1 | Surface Mountable Electronic Components, Inc. (Austin, TX) | MCCE182-K2NR |
| 559 | Switching diode | 1 | Zetex, Inc. (Commack, NY) | FMMD914 |
| 551–553, 555–556 | NPN transistor | 5 | ROHM Co., Ltd. (Antioch, TN) | MMST5089 |
| 554 | N-Channel MOSFET | 1 | Digi-key (Fairchild) | NDS351-NCT-ND |
| 558 | Transformer/antenna | 1 | Pole Zero Corp. (West Chester, Ohio) | See U.S. patent application Ser. No. 08/956,732 |
| 566 | Watch crystal | 1 | Raltron (Miami, FL) | R38-32.768-KHz |
| 561–564 | Quad 2-In NAND | 1 | National Semiconductor Corp. (Santa Clara, CA) | CD4011BCM |

TABLE 1-continued

| Reference Numeral(s) | Description | Quantity | Manufacturer | Manufacturer's Part Number |
|---|---|---|---|---|
| 571–576 | Dual D Flip Flop | 3 | National Semiconductor Corp. (Santa Clara, CA) | CD4013BCM |
| 583 | 18-Bit State Shift Register | 1 | SGS Thomson | 4006BM |
| 582 | Processor | 1 | Microchip Technology, Inc. (Chandler, AZ) | PIC16LC71-04I/SO |
| 581 | Mux/Demux | 1 | National Semiconductor Corp. (Santa Clara, CA) | CD4052BCM |

Figure 6:
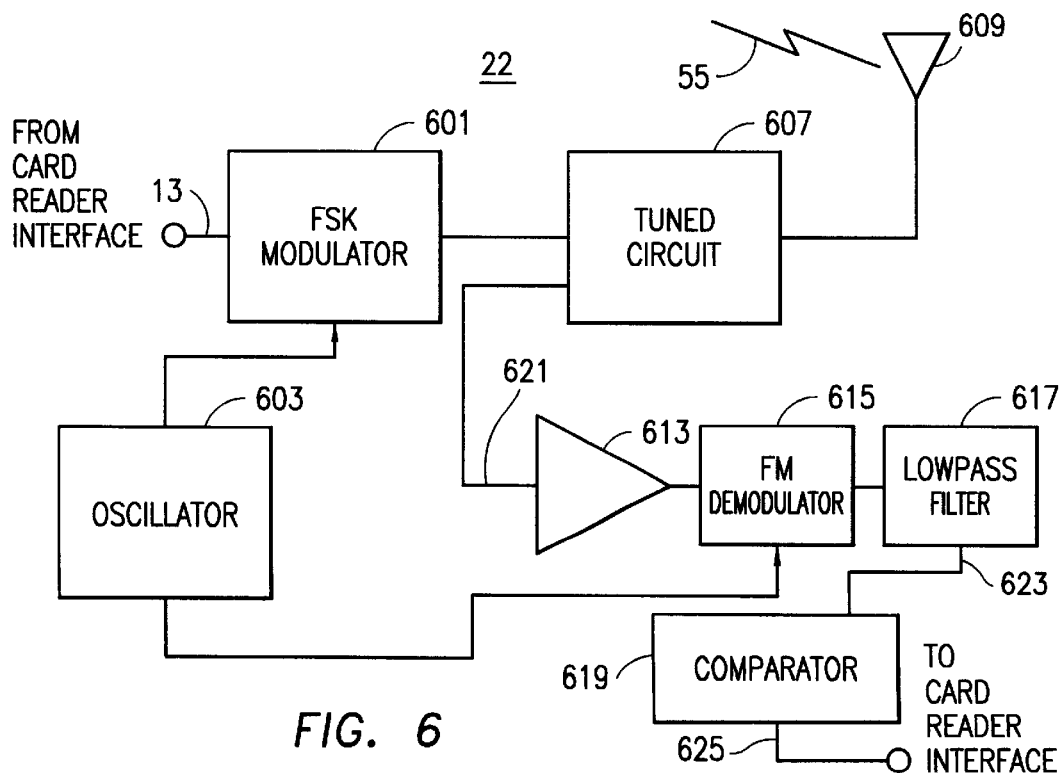
FIG. 6 is a block diagram depiction of a preferred transceiver for use with a product dispenser incorporated in the product vending system of FIG. 1.

FIG. 6 is a block diagram depiction of a preferred transceiver 22 for use with a product dispenser 18 incorporated in the product vending system 10 of FIG. 1. The dispenser transceiver 22 includes an FSK modulator 601, an oscillator 603, a tuned circuit 607, an antenna 609, a receiver amplifier 613, an FM demodulator 615, a lowpass filter 617, and a comparator 619. In the preferred embodiment, most of the transceiver circuitry resides in a microprocessor as described below with respect to FIG. 7.

Upon instruction from the transaction controller 30 via a data bus coupled to the dispensing hose 13 (e.g., during a dispenser transceiver polling cycle), the FSK modulator 601 modulates a carrier frequency generated by the oscillator 603 to represent the data (e.g., an interrogation signal) provided by the transaction controller 30. The FSK-modulated signal is then applied to the tuned circuit 607 and antenna 609 for transmission as a radio signal 55. The tuned circuit 607 and antenna 609 preferably comprise elements substantially similar to the tuned circuit 307 and antenna 309 of the receptacle transceiver 50, except that the antenna 309 of the dispenser transceiver 22 is preferably divided into two antenna elements, as shown in FIG. 7 and discussed in more detail below.

If a receptacle transceiver (e.g., receptacle transceiver 50) receives the interrogation signal and responds thereto, the dispenser receiver 22 receives billing information from the receptacle transceiver in the form of a radio signal 55. The antenna 609 receives the billing information signal and provides it to the tuned circuit 607. As discussed above, the billing information signal preferably constitutes a simulated FM signal. The tuned circuit 607 filters and averages the received signal to produce a signal 621 that further emulates an FM signal. Referring back to FIG. 4, the instantaneous frequency of signal 621 is depicted in the fifth diagram from the top. Thus, the receiving antenna 609 and the tuned circuit 607 further spread the transmitted signal to simulate an FM waveform. The simulated FM signal is amplified and leveled by the receiver amplifier 615 to produce a constant envelope signal at a frequency of the oscillator 603 that is applied to the FM demodulator 615. The FM demodulator converts the FM signal 621 to baseband and provides the baseband signal to the lowpass filter 617 (e.g., a 3-pole Butterworth filter). The lowpass filter 617 reconstructs the FM waveform 623, such that a simple magnitude comparator 619 may be used to reconstruct the original data waveform 625. The reconstructed FM waveform 623 and the recovered data 625 are depicted in FIG. 4 as the bottom two diagrams, respectively. It should be noted that time delays associated with filtering, transmission, and other processing are excluded from the timing diagrams of FIG. 4 for the purpose of clarity.

Figure 7:
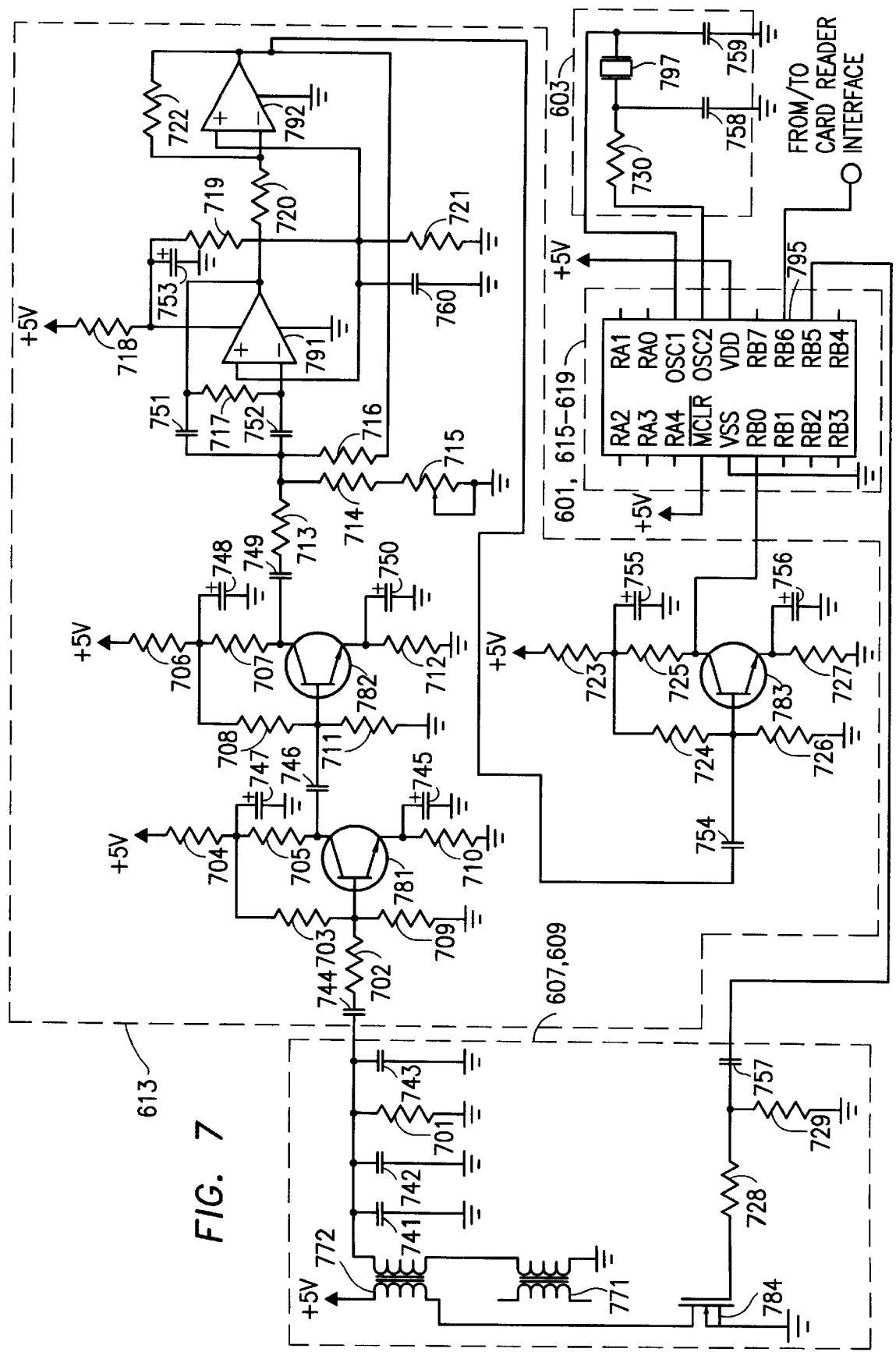
FIG. 7 is a circuit schematic of a preferred embodiment of the transceiver of FIG. 6.

FIG. 7 is a circuit schematic of a preferred embodiment of the dispenser transceiver 22 of FIG. 6. The preferred transceiver 22 comprises a plurality of resistors 701–730, a plurality of capacitors 741–759, a plurality of transistors 781–784, two inductors 771, 772, two operational amplifiers 791, 792, a piezoelectric crystal 797, and a microcontroller 795. The microcontroller 795 functions as the FSK modulator 601, the FM demodulator 615, the lowpass filter 617, and the comparator 619. The source code for the microcontroller 795, less any code related to encryption or decryption, is provided in the attached microfiche appendix.

The oscillator 603 is formed using a conventional 10 MHz piezoelectric crystal 797, one resistor 730, proper loading capacitors 758, 759, and a conventional oscillator gate (contained in the microcontroller 795) as is well known in microelectronic designs. The oscillator 603 provides a uniform clock waveform at a carrier frequency of 10 MHz having exceptional accuracy due to the crystal 797. The carrier and integer subharmonic frequencies are utilized to provide the timebase for dispenser transceiver timing and synchronous clocking of microcontroller state machines.

The tuned circuit 607 comprises a resonant circuit and a driver circuit. The resonant circuit is formed from resistor 701, capacitors 741–743, and inductors 771, 772. The resonant circuit includes the antenna 609, which is formed by the two inductors 771, 772. The driver circuit comprises MOSFET transistor 784, resistors 728 and 729, capacitor 757, and NAND gates that are resident in the microcontroller 795. Operation of the tuned circuit 607 is provided in detail in commonly-assigned U.S. patent application Ser. No. 08/956,732, which is incorporated herein by reference. The receiver amplifier 613 is formed from the combination of resistors 702–727, capacitors 744–756, transistors 781–783, and operational amplifiers 791 and 792.

Table 2 below is a parts listing for the preferred transceiver 22 of FIGS. 7A–7B. In the preferred embodiment, all elements of the transceiver 22, with the exception of the crystal 797 and all the elements forming the receiver amplifier 613, the tuned circuit 607, and the antenna 609, are implemented within an ASIC.

TABLE 2

| Reference Numeral(s) | Description | Quantity | Manufacturer | Manufacturer's Part Number |
|---|---|---|---|---|
| 701 | 33 kΩ resistor | 1 | Panasonic Industrial Co. (Div. Of Matsushita Electric Corp. of America) (Secaucus, NY). | ERJ-3GSYJ-333 |
| 703, 708, 724 | 560 kΩ resistor | 3 | Panasonic Industrial Co. (Div. Of Matsushita Electric Corp. of America) (Secaucus, NY). | ERJ-3GSYJ-564 |
| 726 | 300 kΩ resistor | 1 | Panasonic Industrial Co. (Div. Of Matsushita Electric Corp. of America) (Secaucus, NY). | ERJ-3GSYJ-303 |
| 709, 711 | 330 kΩ resistor | 2 | Panasonic Industrial Co. (Div. Of Matsushita Electric Corp. of America) (Secaucus, NY). | ERJ-365YJ-334 |
| 705 | 200 kΩ resistor | 1 | Panasonic Industrial Co. (Div. | ERJ-3GSYJ-204 |

TABLE 2-continued

| Reference Numeral(s) | Description | Quantity | Manufacturer | Manufacturer's Part Number |
|---|---|---|---|---|
| 710 | 82 kΩ resistor | 1 | Panasonic Industrial Co. (Div. Of Matsushita Electric Corp. of America) (Secaucus, NY). | ERJ-3GSYJ-823 |
| 702 | 18 kΩ resistor | 1 | Panasonic Industrial Co. (Div. Of Matsushita Electric Corp. of America) (Secaucus, NY). | ERJ-3GSYJ-183 |
| 718, 728 | 100 Ω resistor | 2 | Panasonic Industrial Co. (Div. Of Matsushita Electric Corp. of America) (Secaucus, NY). | ERJ-3GSYJ-101 |
| 713, 717 | 360 kΩ resistor | 2 | Panasonic Industrial Co. (Div. Of Matsushita Electric Corp. of America) (Secaucus, NY). | ERJ-3GSYJ-364 |
| 714 | 820 Ω resistor | 1 | Panasonic Industrial Co. (Div. Of Matsushita Electric Corp. of America) (Secaucus, NY). | ERJ-3GSYJ-821 |
| 715 | 200 Ω potentiometer | 1 | Digi-Key | P1S201CT |
| 707 | 6.8 kΩ resistor | 1 | Panasonic Industrial Co. (Div. Of Matsushita Electric Corp. of America) (Secaucus, NY). | ERJ-3GSYJ-682 |
| 727 | 2.2 kΩ resistor | 1 | Panasonic Industrial Co. (Div. Of Matsushita Electric Corp. of America) (Secaucus, NY). | ERJ-3GSYJ-222 |
| 716 | 680 kΩ resistor | 1 | Panasonic Industrial Co. (Div. Of Matsushita Electric Corp. of America) (Secaucus, NY). | ERJ-3GSYJ-684 |
| 719, 721, 729 | 100 kΩ resistor | 3 | Panasonic Industrial Co. (Div. Of Matsushita Electric Corp. of America) (Secaucus, NY). | ERJ-3GSYJ-104 |
| 720 | 39 kΩ resistor | 1 | Panasonic Industrial Co. (Div. Of Matsushita Electric Corp. of America) (Secaucus, NY). | ERJ-3GSYJ-393 |
| 712 | 8.2 kΩ resistor | 1 | Panasonic Industrial Co. (Div. Of Matsushita Electric Corp. of America) (Secaucus, NY). | ERJ-3GSYJ-822 |
| 706 | 1.2 kΩ resistor | 1 | Panasonic Industrial Co. (Div. Of Matsushita Electric Corp. of America) (Secaucus, NY). | ERJ-3GSYJ-122 |
| 725 | 20 kΩ resistor | 1 | Panasonic Industrial Co. (Div. Of Matsushita Electric Corp. of America) (Secaucus, NY). | ERJ-3GSYJ-203 |
| 723 | 5.1 kΩ resistor | 1 | Panasonic Industrial Co. (Div. Of Matsushita Electric Corp. of America) (Secaucus, NY). | ERJ-3GSYJ-512 |
| 730 | 10 Ω resistor | 1 | Panasonic Industrial Co. (Div. Of Matsushita Electric Corp. of America) (Secaucus, NY). | ERJ-3GSYJ-100 |
| 722 | 120 kΩ resistor | 1 | Panasonic Industrial Co. (Div. Of Matsushita Electric Corp. of America) (Secaucus, NY). | ERJ-3GSYJ-124 |
| 704 | 220 Ω resistor | 1 | Panasonic Industrial Co. (Div. Of Matsushita Electric Corp. of America) (Secaucus, NY). | ERJ-3GSYJ-221 |
| 744, 746, 749, 754 | 1000 pF capacitor | 4 | Surface Mountable Electronic Components, Inc. (Austin, TX) | MCCE102K1-NRT1 |
| 741 | 0.01 μF capacitor | 1 | NIC Components Corp. (Amityville, NY) | NSPC103J50-TRB2 |
| 742 | 3900 pF capacitor | 1 | Surface Mountable Electronic Components, Inc. (Austin, TX) | MCCE392J-4NO |
| 747, 748, 750, 755, 756 | 3.3 μF capacitor | 5 | KEMET | T491A335K0-10AS |
| 745, 760, | 0.1 μF capacitor | 2 | Surface Mountable Electronic Components, Inc. (Austin, TX) | MCCE104M-2NU |
| 753 | 22 μF capacitor | 1 | KEMET | T491C226K0-10AS |
| 751, 752 | 1000 pF capacitor | 2 | Panasonic Industrial Co. (Div. Of Matsushita Electric Corp. of America) (Secaucus, NY). | ECU-V1H102JCX |
| 758 | 39 pF capacitor | 1 | Surface Mountable Electronic Components, Inc. (Austin, TX) | MCCE390J-1NOT1 |
| 759, 743 | 27 pF capacitor | 1 | Surface Mountable Electronic Components, Inc. (Austin, TX) | MCCE270J-1NOT1 |
| 757 | 0.01 μF capacitor | 1 | Surface Mountable Electronic Components, Inc. (Austin, TX) | MCCE103-K2NR |
| 771 | 12 μH inductor | 1 | Pole Zero Corp. (West Chester, OH) | |

TABLE 2-continued

| Reference Numeral(s) | Description | Quantity | Manufacturer | Manufacturer's Part Number |
|---|---|---|---|---|
| 772 | Inductor with wire secondary | 1 | Pole Zero Corp. (West Chester, OH) | |
| 781–783 | NPN transistor | 3 | ROHM Co., Ltd. (Antioch, TN) | MMST5089 |
| 784 | N-Channel MOSFET | 1 | Digi-key (Fairchild) | NDS351-NCT-ND |
| 797 | 10 MHz crystal | 1 | ECS, Inc. | ECS-100-S-5P |
| 795 | 8 bit Microcontroller | 1 | Microchip Technology, Inc. (Chandler, AZ) | PIC16F84-101/SO |
| 791, 791 | Dual Operational Amplifier | 1 | Texas Instruments | TLC2272 |

FIG. 8 is a block diagram of a jamming circuit 44 in accordance with a preferred embodiment of the present invention. The jamming circuit 44 includes an amplifier 801, a tuned circuit 803, and an antenna 805, and is preferably affixed in proximity to the dispenser retainer (e.g., nozzle boot). The amplifier 801 amplifies an input signal 205 representing a jamming code bit sequence received from the transaction controller (card reader interface). The input signal 205 is at a receive frequency of the dispenser transceiver.

The tuned circuit 803 preferably comprises the necessary capacitors, inductors, and resistors to facilitate transmission of the amplified jamming signal. In the preferred embodiment, a single inductor of the tuned circuit 803 serves as the antenna 809. In an alternative embodiment, a resonant circuit, such as the circuit described in detail in U.S. patent application Ser. No. 08/956,732, may be employed as the combination of the tuned circuit 803 and the antenna 805.

The jamming circuit 44 serves two functions. First, the jamming circuit 44 serves to indicate to the associated card reader interface that the dispenser 18 has been returned to the retainer, signaling the completion of a vending transaction. This indication is accomplished through the dispenser transceiver's reception of a unique bit sequence (jamming code) transmitted only by the jamming circuit 44, and not by any receptacle transceiver 50. Second, the jamming circuit 44 functions as a disablement device for the receive portion of the dispenser transceiver 22 when the dispenser 18 is placed in its retainer (e.g., nozzle boot 48) and no vending transaction is taking place. The disablement occurs as a result of the jamming circuit 44 radio emissions dominating the receive portion of the dispenser transceiver 22. Such disabling of the receive portion of the dispenser transceiver 22 is desired to prevent the dispenser transceiver 22 from erroneously receiving billing information from other receptacle transceivers 50 that may either be engaged in vending transactions with other dispenser transceivers 22 or be periodically transmitting from vehicles that are simply passing or are parked nearby the vending machine.

FIG. 9 is a logic flow diagram 900 illustrating steps executed by a card reader interface 30 to generate a control signal to enable a vending machine to dispense a product in accordance with a preferred embodiment of the present invention. The card reader interface 30 masters the control of the vending transaction in a fixed sequence that is programmed into a microcontroller. Microcontroller source code, less decryption routines, that may be executed by the card reader interface 30 to perform the logic flow depicted in FIG. 9 is contained in the attached microfiche appendix and is incorporated into the present specification as if fully set forth herein.

The logic flow begins (901) when, upon power up of the card reader interface microcontroller, the card reader interface 30 initializes (903) itself, including its ports and internal variables. After initializing itself, the card reader interface 30 initializes (905) each dispenser transceiver 22 that it controls. The card reader interface 30 conveys a stimulus, in sequential order, to each dispenser transceiver 22. Upon proper response by a dispenser transceiver 22 to the stimulus, the card reader interface 30 identifies the dispenser transceiver 22 as being active, and initializes appropriate constants, if applicable, in the dispenser transceiver 22 via a command process. For example, the card reader interface 30 might convey timing parameter constants to the dispenser transceiver 22 during the initialization phase.

After all active dispenser transceivers 22 have been initialized, the card reader interface 30 enters its normal mode of operation and performs the steps depicted in blocks 907–931. During its normal mode of operation, the card reader interface 30 enters into a polling cycle with respect to each dispenser transceiver 22. That is, the card reader interface 30 polls (907) a first dispenser transceiver and determines (909) whether a receptacle transceiver 50 is present. The polling command instructs the dispenser transceiver 22 to transmit an interrogation signal during a first time period (e.g., 135 milliseconds) and, upon termination of the first time period, receive signals, such as an acknowledgment of receipt of the interrogation signal, during a second time period (e.g., 35 milliseconds). Upon expiration of the second time period, the dispenser transceiver 22 demodulates the received signals to recover any received data and forwards the data to the card reader interface 30. The card reader interface 30 then correlates the received data with a predetermined acknowledgment sequence to determine whether an acknowledgment was received and, therefore, whether a receptacle transceiver 50 is present.

If no receptacle transceiver is present in the coverage area of the first dispenser transceiver 22, the card reader interface 30 sequentially polls (925, 929) each other dispenser transceiver 22 in a similar manner. If no receptacle transceiver 50 is present at any of the dispenser transceivers 22, the polling process restarts at block 907. However, if a receptacle transceiver 50 is determined (909, 927, 931) to be present during any polling cycle, the card reader interface 30 commences communication with the respective receptacle transceiver 50, which, at a minimum, encompasses initializing (911) a download of billing information (e.g., credit or debit card account number) for a consumer to be charged for the product from the receptacle transceiver 50, for example by deactivating jamming circuit 44 transmissions to improve the environment for dispenser transceiver reception or transmitting a predetermined query sequence, and receiving (913) the billing information. In the preferred embodiment, the card reader interface 30 and the receptacle transceiver 50 enter into a communications protocol via the dispenser transceiver 22, which protocol includes exchanging encrypted data, data parity checks, and acknowledgment handshaking.

Upon receiving the billing information, the card reader interface 30 decompresses and decodes (915) the account number and reformats it for transmission to the vending site card reading device 35 or Point of Sale (POS) computer. In the preferred embodiment, the receptacle transceiver 50 compresses the billing information prior to transmission to enable such information to be transmitted in a shorter period of time, thereby saving battery life. To compress the billing information, the receptacle transceiver 50 preferably represents a group of digits by a single binary symbol in accordance with known techniques, thereby making more efficient use of binary symbols. After extracting the account information, the card reader interface 30 seizes (917) control of the card receptacle 32 control lines utilizing a multiplexer and conveys the account information to the POS computer using a format that emulates (919) a manual swipe of a customer's credit or debit card in the card receptacle 32.

Once the account information has been reliably conveyed to the POS processor and authorization for the transaction has been received, the card reader interface releases (921) the card receptacle control lines, allowing normal operation of the card receptacle and thereby effectively generating a control signal enabling the dispenser to dispense the product. That is, in the preferred embodiment, the card reader interface 30 provides a stimulus (account information) for allowing the card reading device 35 and its associated circuitry to engage in normal routines to interact with the vending device's conventional dispensing control electronics and valving (not shown) to either enable or disable dispensing. Thus, in the preferred embodiment, the card reader interface indirectly enables or disables dispensing of the product. In an alternative embodiment, upon receiving authorization for the transaction from the POS computer, the card reader interface 30 might directly interact with the vending device's conventional dispensing control electronics and valving to enable or disable dispensing.

After completion of the billing information transfer, the card reader interface 30 may engage in one or more of a variety of activities, such as ceasing communication with the receptacle transceiver 50 or continuing communication with the receptacle transceiver 50 for the purpose of affirming the proximity of the receptacle transceiver 50, uploading additional information (e.g., a new account number) to the receptacle transceiver 50, or downloading information from the receptacle transceiver 50.

After the card reader interface 30 has ceased communication with the receptacle transceiver 50, the card reader interface 30 determines (923) whether a jamming circuit 44 is proximate. That is, the card reader interface 30 provides the jamming code to the jamming circuit 44 for transmission, if the card reader interface 30 had previously removed such code, and determines whether the dispenser transceiver 22 has received the jamming signal to indicate that the dispenser 18 has been returned to its retainer (e.g., nozzle boot 48). When no jamming signal is detected, the card reader interface 30 continues searching for such a signal. When a jamming signal is detected, the card reader interface 30 acknowledges completion of the vending transaction and resumes execution the dispenser transceiver polling cycles as described above.

In addition to the circuitry and system blocks discussed above with respect to FIGS. 2–9, the preferred vending system also includes an intrinsic safety circuit (not shown) utilized in the cable connection between the card reader interface 30 and the dispenser transceiver 22. The intrinsic safety circuit is designed to meet requirements set forth by the Underwriters Laboratories which prescribe the measures to be taken to ensure intrinsic safety of electrical devices in a fuel dispenser. The intrinsic safety requirements provide for voltage and current limiting on any electrical conductor that enters or passes through the designated fuel vapor region(s) of a fuel dispenser. The intrinsic safety circuitry is well known in the art and fundamentally comprises a circuit containing shunt diodes for voltage limiting and series resistors and/or fuses for current limiting.

Figure 10:
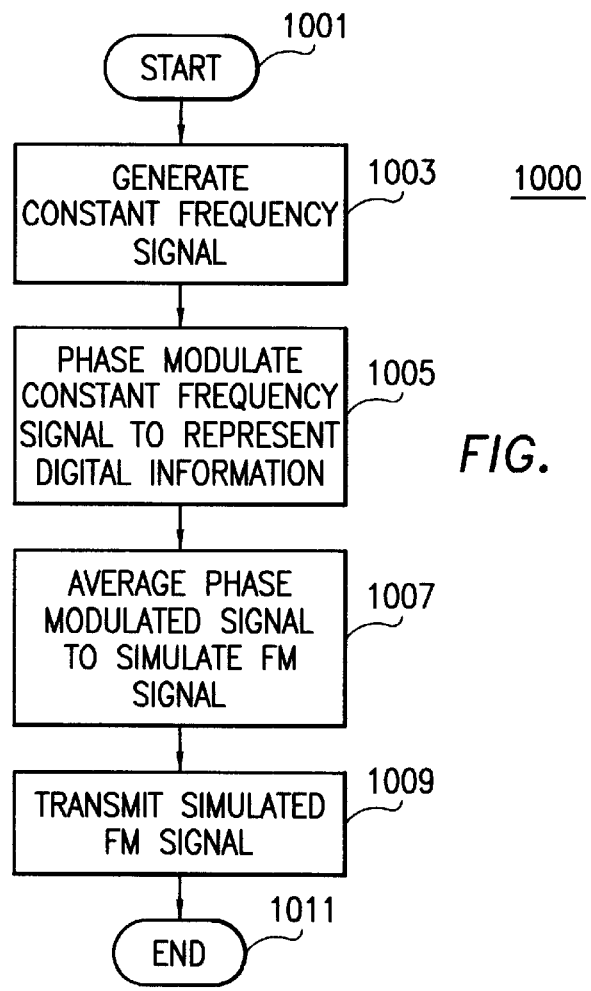
FIG. 10 is a logic flow diagram illustrating steps executed by a transmitting device to transmit digital information, even from a substantially electrically shielded environment, in accordance with a preferred embodiment of the present invention.

FIG. 10 is a logic flow diagram 1000 illustrating steps executed by a transmitting device to transmit digital information from a substantially electrically shielded enclosure, or other substantially electrically shielded environment, in accordance with a preferred embodiment of the present invention. The logic flow begins (1001) when the transmitting device generates (1003) a constant frequency signal. In the preferred embodiment, the constant frequency signal is a sinusoid at a frequency of approximately 8.192 kilohertz. However, any constant frequency signal having a center frequency of about ten kilohertz or less may be used.

Once the constant frequency signal is generated, the transmitting device phase modulates (1005) the constant frequency signal to represent digital information to be transmitted. That is, the transmitting device varies an instantaneous phase of the constant frequency signal over a period of time to represent the digital information to be transmitted. In the preferred embodiment, the transmitting device applies two phase transitions during any one bit transmission period to represent a bit of digital information. Accordingly, the transmitting device transitions the phase of the constant frequency signal from a first phase (e.g., 0 degrees) to a second phase (e.g., 270 degrees) during a first portion (e.g., first half) of the bit transmission period and then transitions the phase of the constant frequency signal from the second phase (270 degrees) to a third phase (e.g., 180 degrees) during a second portion (e.g., second half) of the bit transmission time period. In the preferred embodiment, the transmitting device represents a binary "zero" by transitioning the phase of the constant frequency signal in a clockwise direction (with respect to a phasor representation of the constant frequency signal) through two phase transitions per bit transmission time period. Similarly, in the preferred embodiment, the transmitting device represents a binary "one" by transitioning the phase of the constant frequency signal counterclockwise through two phase transitions per bit transmission time period. In an alternative embodiment, the transmitting device may transition the phase of the constant frequency signal through more than two phase transitions during any one bit transmission time period to represent the respective bit to ultimately be transmitted. The number of phase transitions during any particular bit transmission period is determined based on the amount of subsequent filtering and averaging employed to disperse the FM impulse response resulting from the instantaneous phase transitions, and the effective FM deviation desired. In the preferred embodiment, two phase transitions were found to be sufficient when both the transmitting device and the receiving device incorporated the aforementioned tuned resonant circuits to average and spread the frequency response.

Once the phase modulated signal is produced, the transmitting device averages (1007) the phase modulated signal to simulate an FM signal. As briefly mentioned above, the transmitting device preferably employs a tuned resonant circuit to filter, and thereby average, the phase modulated signal. The tuned resonant circuit employed in the preferred embodiment may suitably comprise a resonant circuit and drive circuit, such as those described in co-pending, commonly-assigned U.S. patent application Ser. No.08/956,732. The transmitting device then transmits (1009) the simulated FM signal, and the logic flow ends (1011).

The transmitting device transmits the simulated FM signal primarily via a magnetic field at a carrier frequency of about ten kilohertz or less. In the preferred embodiment, a carrier frequency of 8.192 kilohertz is used. The use of both a low frequency carrier and magnetic coupling allows the transmitting signal to escape substantially electrically shielded enclosures, such as automobile trunks, automobile hoods, or automobile fuel inlets, and provides for a fairly well constrained transmission range due to the mathematical relation that magnetic coupling decreases in proportion to the cube of the distance from the magnetic source. The transmission range of the transmitting device in the preferred embodiment remains nearly constant regardless of whether the transmitting device is transmitting from a shielded enclosure or not due to its use of magnetic coupling to convey the information. By contrast other wireless radio frequency identification (RFID) systems, such as the "SPEEDPASS" fuel vending system, utilize high frequency electromagnetic transmissions which have varying ranges due to their use of both electric and magnetic fields to convey a signal. In order for a transmitting device using both electric and magnetic fields to transmit from an electrically shielded enclosure, a high power transmitter must be employed to generate a magnetic field component strong enough to be detected outside the shielded enclosure. However, when such a high power transmitter is employed and the shielded enclosure is temporarily removed (e.g., when a trunk is open), the transmission range of the transmitter increases dramatically because the shielding is removed and both the electric and magnetic fields convey information. Furthermore, by using a method as described in blocks 1003–1009 to generate the signal to be transmitted, the complex circuitry typically required for FM modulation is not necessary; thus, inexpensive, small scale integrated (SSI) circuits can be used to produce the simulated FM signal.

Figure 11:
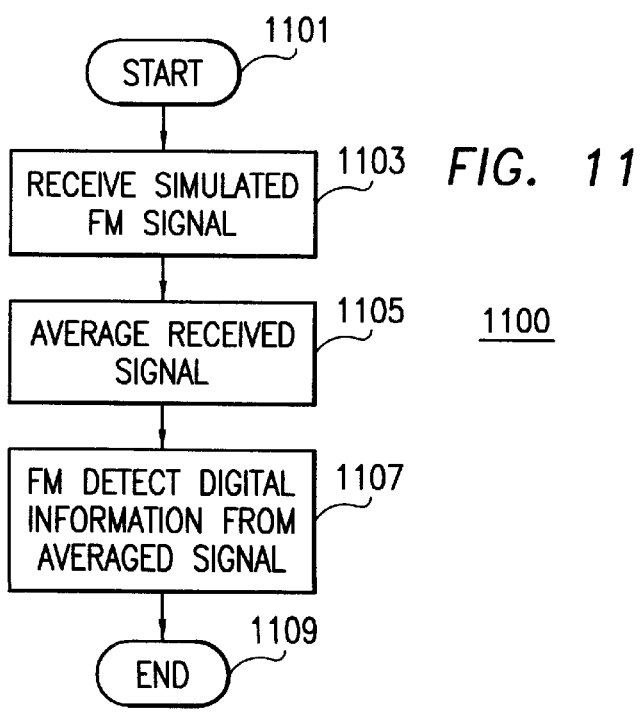
FIG. 11 is a logic flow diagram illustrating steps executed by a receiving device to receive digital information transmitted, even from a substantially electrically shielded environment, in accordance with a preferred embodiment of the present invention.

FIG. 11 is a logic flow diagram 1100 illustrating steps executed by a receiving device to receive digital information, such as that generated and transmitted in accordance with FIG. 10. The logic flow begins (1101) when the receiving device, which is preferably located outside the substantially electrically shielded environment, receives (1103) the simulated FM signal from the transmitting device. The receiving device averages (1105) the received signal using a tuned resonant circuit, such as the resonant circuit and drive circuit described in U.S. patent application Ser. No. 08/956,732, to more closely emulate a true FM signal. Since an FM signal is now effectively present, the receiving device FM detects (1107) the transmitted digital information from the averaged signal, and the logic flow ends (1109). Therefore, in sum, by using the novel signal generation technique described in FIG. 10 and by employing tuned resonant circuits in both the transmitting device and the receiving device, simple microcontroller-based FM detection techniques may be employed in the receiving device to detect the digital information present in the transmitted signal, without requiring complex FM generation circuits to be employed by the transmitting device to produce the original FM signal. By further using low frequency magnetic field transmissions, the present invention permits inexpensive transmission of digital information through electrically shielded enclosures, while maintaining a relatively fixed transmission range under all conditions.

Figure 12:
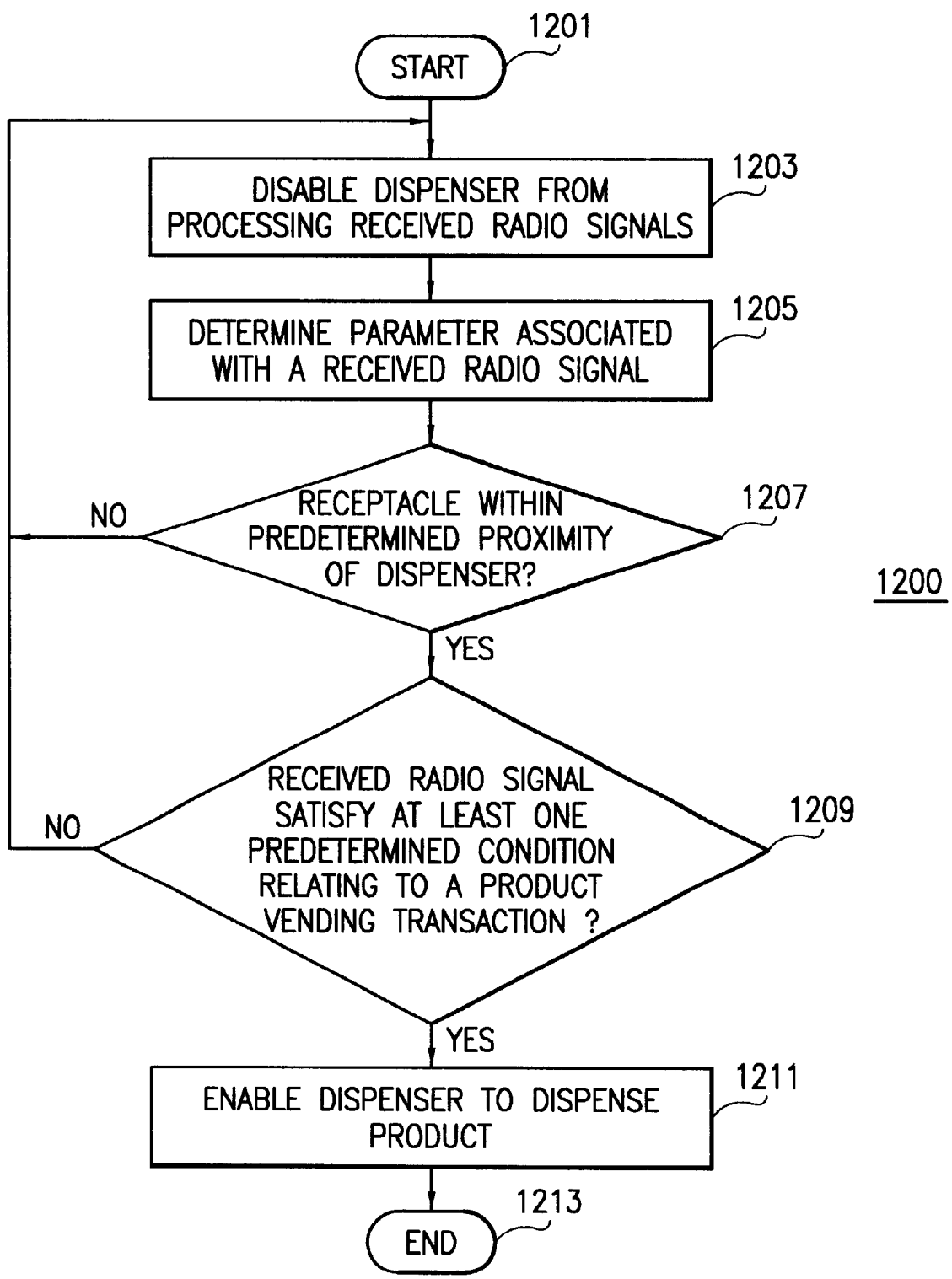
FIG. 12 is a logic flow diagram illustrating steps executed by a product vending system to vend a product in accordance with the present invention.

FIG. 12 is a logic flow diagram 1200 illustrating steps executed by a product vending system to vend a product in accordance with the present invention. The logic flow begins (1201) when the product vending system disables (1203) a product dispenser from processing received radio signals. In a preferred embodiment, as described above, the product vending system employs a jamming circuit 44 to produce jamming signals at a receive frequency of the dispenser's receiver to thereby prevent the receiver from receiving radio signals while the dispenser 18 is in close proximity to the jamming circuit 44. The use of a jamming circuit is preferred over the use of a limit switch, proximity sensor, or other device because a jamming circuit is reliable and requires minimal electrical and mechanical modifications to an existing product vending device (e.g., the jamming circuit can be attached to the external surface of the existing vending device).

In an alternative embodiment, the product vending system's transaction controller may disable power to the dispenser receiver when the dispenser is physically in contact with its retainer 48. For example, one or more limit switch-type electrical contacts could be provided between the dispenser and its retainer when the dispenser is connected to, or placed on or in, its retainer 48. However, such an approach has disadvantages when the dispenser and retainer are intended for use in undesirable environmental conditions, such as outside fuel pump vending machines, that may result in corrosion of electrical contacts and subsequent failing of the disablement circuit. In addition, such an embodiment could result in the false reception of a signal from a receptacle receiver 50 located on the side of the product vending machine opposite the side on which the dispenser transceiver 22 is responsible for servicing.

The product vending system determines (1205) a parameter associated with each received radio signal. When the dispenser 18 is in close proximity to the jamming circuit 44, the dispenser receiver receives a jamming code from the jamming circuit 44 and the product vending system determines that no vending is to take place. However, when the dispenser 18 is moved in close proximity to a receptacle 51 of the product to be vended, the product vending system determines that another signal is now being received and determines a parameter of the newly received radio signal.

In the preferred embodiment, the signal parameter determined by the vending system is signal strength because once the signal strength of the radio signal detected by the product vending device is strong enough to overcome the signal strength of the jamming signal, the product vending device can detect the presence of a receptacle transmitter or transceiver 50, thereby indicating that vending may need to take place. Thus, upon determining the parameter of the received signal, the product vending system determines (1207) whether a receptacle for the product is within a predetermined proximity of the dispenser 18. In the preferred embodiment, this determination is made when the dispenser 18 is in sufficient proximity of the fuel inlet 51 to receive a signal from the receptacle transceiver 50 mounted in physical proximity to the fuel inlet 51. The product vending system thus determines that the receptacle 51 is in a predetermined proximity of the dispenser 18 based on the signal strength of the signals received by a receiver (e.g., a receive portion of the dispenser transceiver 22) of the product vending system. That is, as discussed above, when only the jamming signal is detectable (i.e., has a strong enough signal strength to prevent reception of any other signals at the dispenser receiver), the product vending system presumes that the receptacle 51 is not within a predetermined proximity of the dispenser 18; whereas, when the radio signal transmitted by a transmitting device (e.g., a transmit portion of the receptacle transceiver 50) in or near the receptacle is detectable (i.e., has a sufficient signal strength to be detected over the jamming signal), the product vending system determines that the receptacle 51 is within sufficient proximity of the dispenser 18 (in the preferred embodiment, less than two meters) to permit vending of the product.

When the receptacle 51 is not within sufficient proximity of the dispenser 18 to permit vending of the product, the logic flow returns to block 1203 and the dispenser 18 remains disabled. However, when the receptacle 51 is within sufficient proximity of the dispenser 18 to enable vending of the product, the product vending system determines (1209) whether the received radio signal satisfies at least one predetermined condition relating to a product vending transaction. For example, when the product vending system receives a signal that is not a jamming signal, the product vending system determines whether the received signal includes billing information for a consumer to be charged for the product. That is, the product vending system determines whether the received radio signal includes a credit card account number, a debit card account number, or some other account number to facilitate payment for the product to be vended. In addition to determining whether or not the radio signal at least includes billing information, the product vending system also preferably determines the validity of billing the account provided in the radio signal, for example by determining whether the radio signal also includes information related to the expiration date of the account (e.g., an expiration date of a credit card).

If a received radio signal does not satisfy all the necessary predetermined conditions (e.g., does not include a billing account number and/or does not include a valid expiration date), the logic flow returns to block 1203 and the dispenser 18 remains disabled. However, in the event that the radio signal does satisfy all the necessary predetermined conditions, the product vending system generates a signal to enable (1211) the product dispenser 18 to dispense the product to the receptacle 51, and the logic flow ends (1213).

Figure 13:
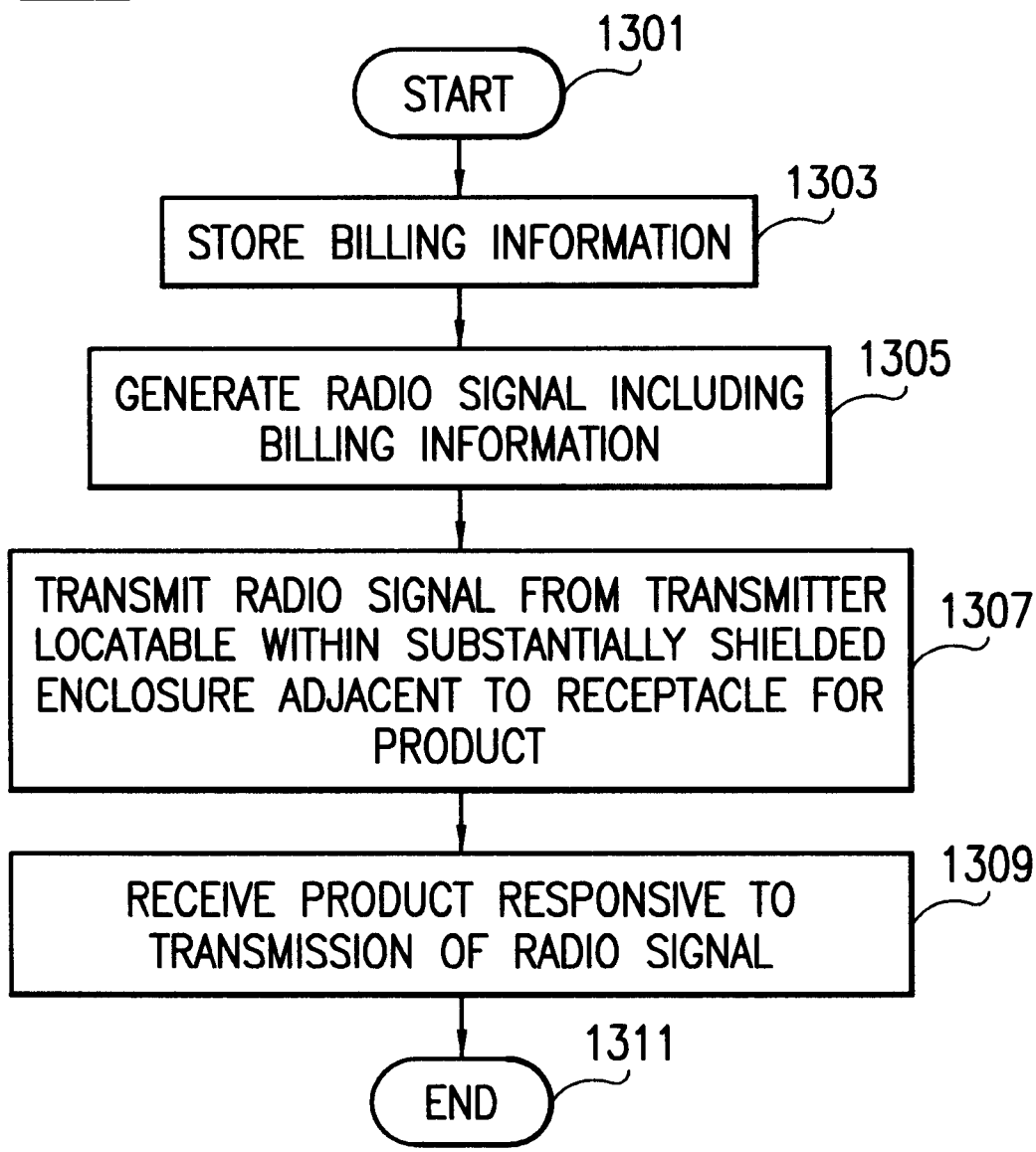
FIG. 13 is a logic flow diagram illustrating steps executed to acquire a product from a vending device in accordance with the present invention.

FIG. 13 is a logic flow diagram 1300 illustrating steps executed to acquire a product from a vending device in accordance with the present invention. The logic flow begins (1301) when a transmitter or transceiver apparatus located in, near, or substantially adjacent to a receptacle for the product stores (1303) billing information in a memory device, such as a read-only memory, a random access memory, or any other memory device. Some time after the billing information is stored in the memory device, the apparatus generates (1305) a radio signal that includes the billing information. In a preferred half-duplex embodiment, the radio signal is generated in response to an interrogation signal that requests the billing information. Such a half-duplex system is described in more detail below with respect to FIGS. 15 and 16. In an alternative simplex system, the apparatus continually or periodically generates the radio signal. In the preferred embodiment, the billing information is encrypted during generation of the radio signal using any one of a variety of known encryption techniques to prevent unintended receivers from receiving such critical information of a consumer.

Once the radio signal is generated, the apparatus transmits (1307) the radio signal from a transmitter (e.g., a transmit portion of the receptacle transceiver 50) locatable within a substantially electrically shielded enclosure physically associated with (e.g., adjacent to) the receptacle 51 for the product. In the preferred embodiment, the radio signal is generated and transmitted in accordance with the method described above with respect to FIG. 10. Additionally, in the preferred vending system discussed above with respect to FIG. 1, the transmitter is located in the trunk of a vehicle substantially adjacent to the receptacle or fuel inlet 51 for receiving fuel from a fuel dispenser 18.

Subsequent to transmitting the radio signal, provided all analysis of the billing information was acceptable, the receptacle receives (1309) the product, and the logic flow ends (1311).

Figure 14:
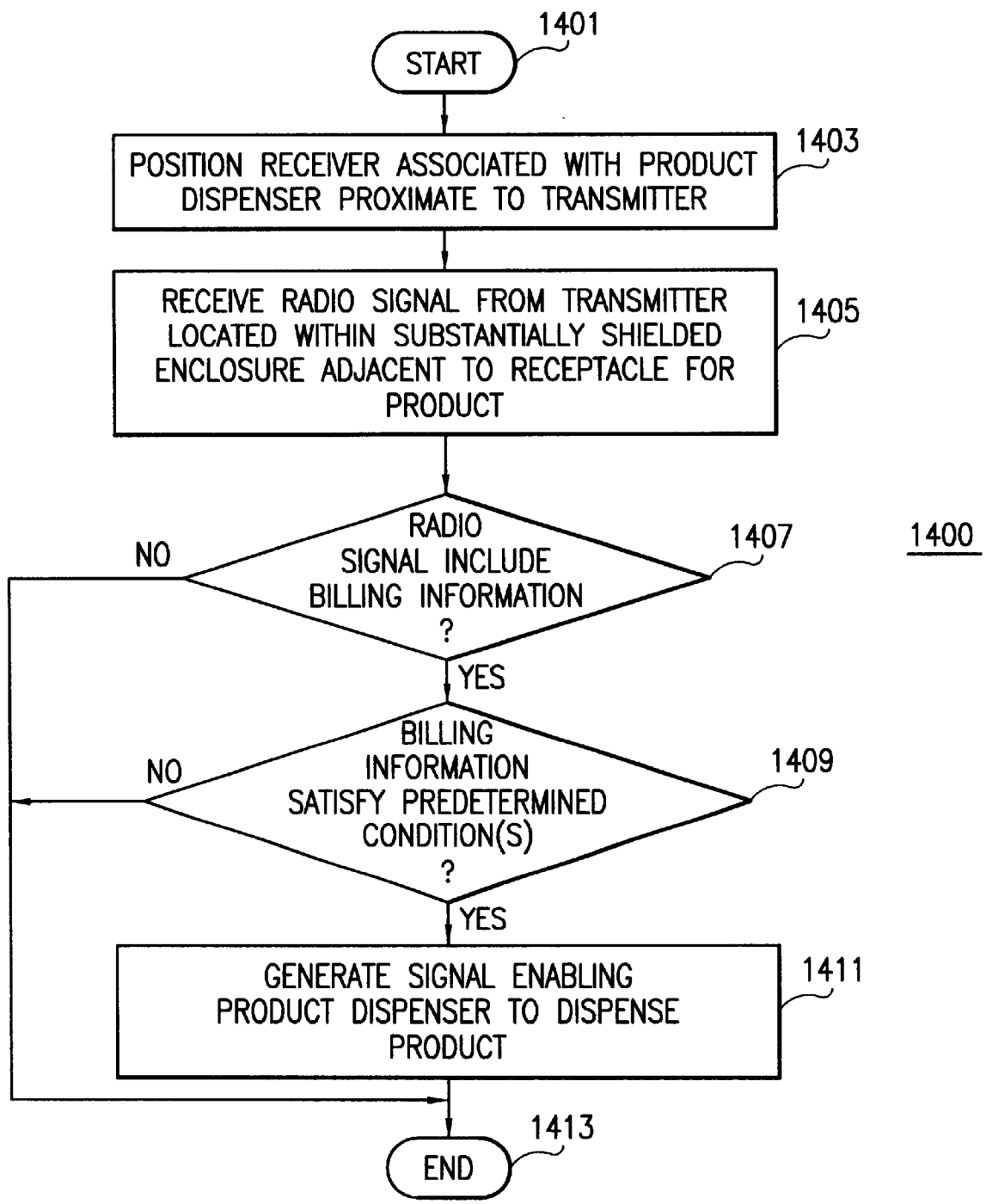
FIG. 14 is a logic flow diagram illustrating steps executed in a product vending system to vend a product in accordance with the present invention.

FIG. 14 is a logic flow diagram 1400 illustrating steps executed in a product vending system to vend a product in accordance with the present invention. The logic flow begins (1401) when a consumer or an attendant positions (1403) a receiver (e.g., a receive portion of the dispenser transceiver 22) associated with the product dispenser 18 proximate to a transmitter (e.g., a transmit portion of the receptacle transceiver 50) located in or substantially near a receptacle 51 for the product. The receiver must be positioned sufficiently close to the transmitter to permit the receiver to receive a radio signal from the transmitter. However, in a preferred embodiment in which the radio signal is conveyed via a low frequency (about ten kilohertz or less) magnetic field and in which the transmitter is located substantially adjacent to the receptacle, the consumer need only position the dispenser in or near the receptacle (as the consumer would ordinarily do anyway) to allow the receiver to receive the radio signal transmitted by the transmitter.

Once the receiver is positioned appropriately, the receiver receives (1405) the radio signal from the transmitter, wherein the transmitter is located within a substantially electrically shielded enclosure adjacent to a receptacle of the product. Upon receiving the radio signal from the transmitter, the receiver demodulates the transmitted signal to recover the digital information included therein and provides the digital information to a transaction controller of the product vending system. The transaction controller then determines (1407) whether the radio signal included billing information for a consumer to be charged for the product. The vending system's transaction controller makes this determination by comparing the digital information provided by the receiver to stored account numbers in a centralized computer database. For example, upon receiving a string of bits from a receiver, the transaction controller determines whether those bits correspond to a credit card account number, a debit account number or some other bank account number and determines further whether the bits contain account validity information, such as credit card expiration date. In the preferred embodiment, transaction controller determines whether the radio signal includes billing information by extracting the bit sequence from the radio signal with the assistance of the receiver and determining whether the bit sequence correlates to a predetermined bit sequence. That is, the transaction controller uses well known correlation techniques to effectively compare the bit sequence of the radio signal with other known bit sequences, such as credit card account numbers, debit card account numbers or other bank account numbers. When the bit sequence correlates to one of the predetermined bit sequences, transaction controller determines that the radio signal does indeed include billing information for a consumer to be charged for the product.

When the radio signal does not include billing information, no product is dispensed and the logic flow ends (1413). However, when the radio signal does include billing information, the transaction controller extracts the billing information and determines (1409) whether the billing information satisfies one or more predetermined conditions as discussed above with respect to FIG. 12. That is, the transaction controller determines whether the billing information is valid (e.g., by checking account validity information contained in the radio signal or by verifying account validity via a wireline communication with a POS computer as is well known in the art). When the billing information does not satisfy one or more of the predetermined conditions, no product is dispensed, and the logic flow ends (1413). When the billing information does satisfy all the predetermined conditions, the transaction controller generates (1411) a signal enabling the product dispenser to dispense the product as described above with reference to FIG. 9, and the logic flow ends (1413).

Figure 15:
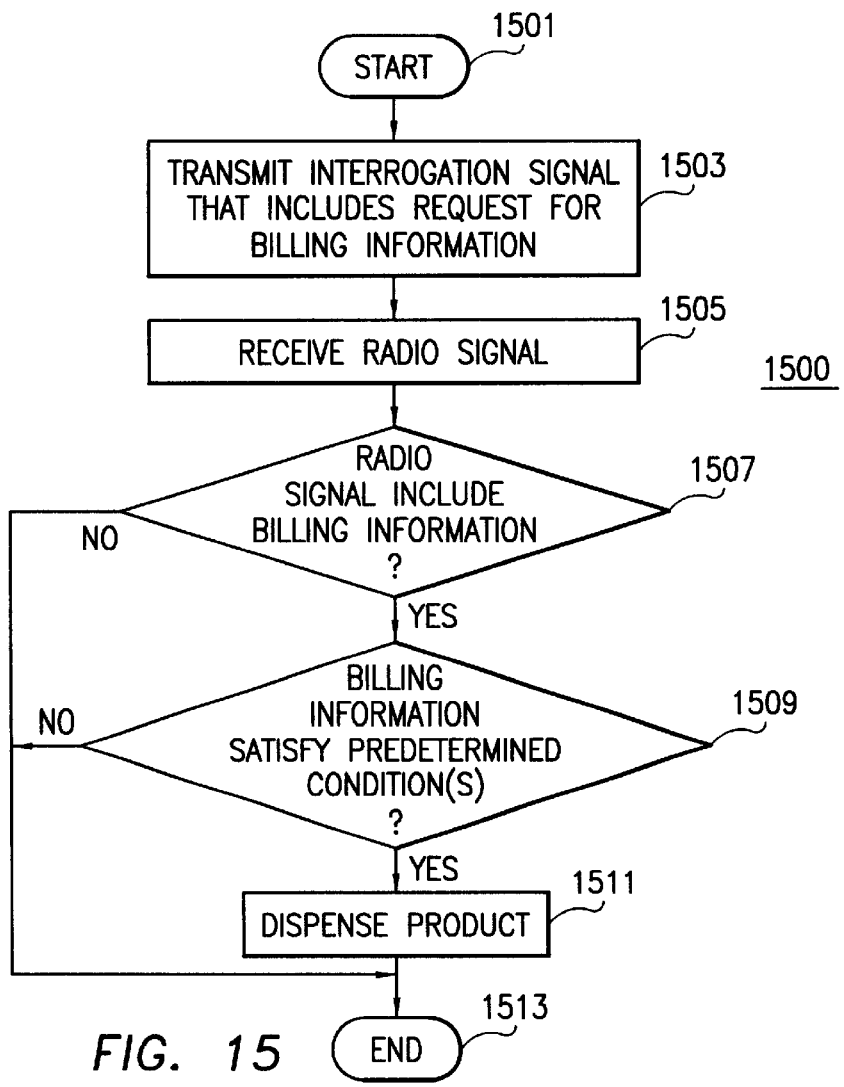
FIG. 15 is a logic flow diagram illustrating steps executed by a product vending device to vend a product in accordance with a preferred embodiment of the present invention.

FIG. 15 is a logic flow diagram 1500 illustrating steps executed by a product vending device to vend a product in accordance with the preferred embodiment of the present invention. The logic flow begins (1501) when the vending device transmits (1503) an interrogation signal that includes a request for billing information of a consumer to be charged for the product vended. Provided that the interrogation signal is received by a transceiver associated with a receptacle for the product, the vending device eventually receives (1505) a radio signal from the transceiving device. Upon reception of the radio signal, the vending device determines (1507) whether the radio signal includes billing information of a consumer to be charged for the product. As discussed above, such a determination is preferably accomplished by extracting a bit sequence (e.g., a preamble, an acknowledgment, or an account number) from the radio signal and determining whether the bit sequence correlates to a predetermined bit sequence. In a preferred embodiment, the vending device and the transceiving device associated with the receptacle for the product utilize a preestablished protocol in which a preamble is included at the beginning of the bit stream transmitted by the transceiving device in response to the interrogation signal. Accordingly, the vending device, upon receiving the radio signal, correlates the preamble (e.g., first 16 bits of the bit stream) extracted from the radio signal with a preamble stored in a memory of the vending device. When the received preamble correlates to the predetermined preamble (e.g., when a magnitude of the correlation between the received preamble and the predetermined preamble exceeds a predetermined magnitude threshold), the vending device determines that the radio signal includes billing information of the consumer.

If the radio signal does not include billing information of the consumer, no product is dispensed, and the logic flow ends (1513). However, if the radio signal does including billing information for a consumer, the vending device determines (1509) whether the billing information satisfies one or more predetermined conditions. That is, once the vending device determines that the radio signal includes billing information via the preamble, the vending device determines whether some or all of the remaining bits of the received bit stream meet certain other criteria, such as being a valid account number and/or indicating a valid expiration date for the account. For example, the vending device upon determining that the radio signal includes billing information might examine the next set of bits to determine whether they satisfy a known mathematical algorithm used by credit and debit card issuers to verify valid account numbers. In the preferred embodiment, the vending device performs this account verification by processing the bits, extracting the account digits, and sending the account number to a particular creditor (also identified in the bit stream represented by the radio signal) for verification. A similar process might be used to verify account expiration date.

If the billing information does not satisfy the predetermined conditions (e.g., does not indicate a valid account number and/or a valid expiration date), no product is dispensed, and the logic flow ends (1513). If the billing information does satisfy the predetermined conditions, the vending device dispenses (1511) the product to the receptacle for the product, and the logic flow ends (1513). Therefore, as described above with respect to blocks 1501–1513, the present invention provides a half duplex system for facilitating cashless vending of products. In sharp contrast to the prior art, such as the "SPEEDPASS" fuel vending system, which provides for simplex operation only (i.e., only a receiver at the vending device and only a transmitter associated with the consumer for the product), the present invention provides a more secure and efficient vending system by requiring transmission of critical information, such as a consumer's credit card number, only in response to a request for such information from the vending device from which a product is desired, instead of continuous transmission of the information as in the prior art. Improved efficiency results from the use of a half duplex system because transmitters, which generally consume the largest amount of power in a transceiver, only need to operate for one short period of time responsive to a request for information.

Figure 16:
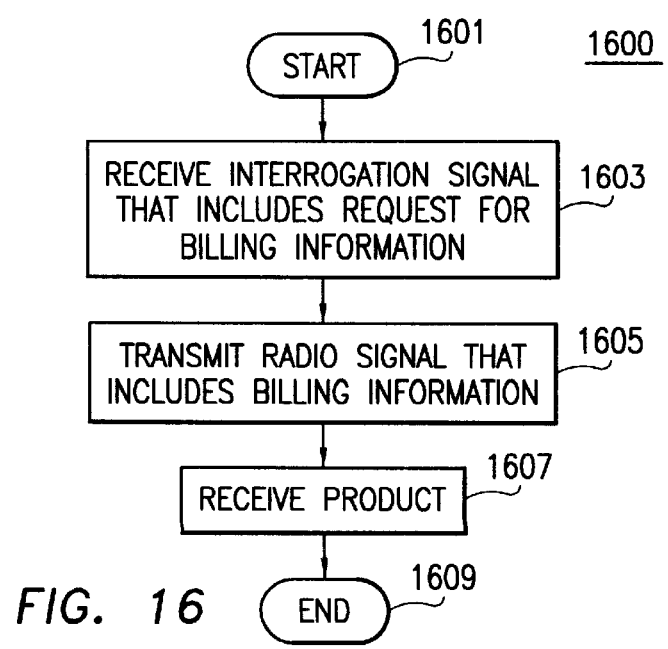
FIG. 16 is a logic flow diagram illustrating steps executed to acquire a product from a vending device in accordance with a preferred embodiment of the present invention.

FIG. 16 is a logic flow diagram 1600 illustrating steps executed to acquire a product from a vending device in accordance with a preferred embodiment of the present invention. The logic flow begins (1601) when a transceiver associated with, and preferably adjacent to, a receptacle for the product receives (1603) an interrogation signal from the vending device that includes a request for billing information for a consumer to be charged for the product. Responsive to the interrogation signal, the transceiver transmits (1605) a radio signal that includes the billing information. In the preferred embodiment, the radio signal is generated in accordance with the method described above with respect to FIG. 10. Provided that the vending device receives and satisfactorily processes the radio signal, the receptacle for the product receives (1607) the product from the vending device, and the logic flow ends (1609).

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method for vending a product from a dispenser to a receptacle for the product, the method comprising the steps of:

disabling the dispenser from processing a received radio signal until the receptacle is located within a predetermined proximity of the dispenser, said step of disabling comprising the step of transmitting a jamming signal to inhibit reception of the radio signal until the receptacle is within the predetermined proximity of the dispenser; and enabling the dispenser to dispense the product in response to reception of at least one said radio signal that satisfies at least one predetermined condition relating to a product vending transaction.

2. The method of claim 1, further comprising the step of determining that the receptacle is located within the predetermined proximity of the dispenser based on a parameter associated with the radio signal.

3. The method of claim 2, wherein the parameter associated with the radio signal comprises a signal strength of the radio signal sufficient to permit reception of the radio signal at the dispenser.

4. A method for vending a product from a product dispenser, the method comprising the steps of:

transmitting a radio signal, by a first transmitter locatable within a substantially electrically shielded environment physically associated with a receptacle for the product, the radio signal representing billing information of a consumer to be charged for the product;

positioning a receiver associated with the product dispenser in sufficient proximity to the first transmitter to permit the radio signal to be received by the receiver;

determining whether the billing information satisfies at least one predetermined condition;

generating a signal that enables the product dispenser to dispense the product in response to determining that the billing information satisfies the at least one predetermined condition and transmitting, by a second transmitter located in a predetermined proximity of the product dispenser, a jamming signal that prevents the receiver from receiving the radio signal when the receiver is in proximity of the second transmitter.

5. The method of claim 4, wherein the step of transmitting a radio signal comprises the step of transmitting the radio signal responsive to the reception of an interrogation signal that includes a request for the billing information.

6. The method of claim 5, further comprising the step of receiving, by a receiver located within the substantially electrically shielded environment, the interrogation signal from a second transmitter associated with the product dispenser prior to the step of transmitting the radio signal.

7. The method of claim 4, further comprising the step of transmitting, by a second transmitter associated with the product dispenser, an interrogation signal, the interrogation signal including a request for billing information.

8. The method of claim 7, wherein the step of transmitting an interrogation signal comprises the step of repeatedly transmitting the interrogation signal.

9. The method of claim 4, wherein the step of transmitting a radio signal comprises the steps of:

generating a constant frequency signal;

producing a phase modulated signal by varying a phase of the constant frequency signal over a period of time to represent the billing information;

averaging the phase modulated signal to produce a simulated frequency modulated signal; and transmitting the simulated frequency modulated signal.

10. The method of claim 9, wherein the billing information consists of a plurality of bits and wherein the step of producing a phase modulated signal comprises the steps of:

transitioning from a first phase to a second phase during a first portion of a bit transmission period; and transitioning from the second phase to a third phase during a second portion of the bit transmission period, thereby representing one bit of the billing information as at least two phase transitions.

11. The method of claim 4, wherein the step of transmitting a radio signal comprises the step of transmitting the radio signal primarily via a magnetic field at a carrier frequency of about ten kilohertz or less.

12. The method of claim 4, further comprising the step of encrypting the billing information prior to the step of transmitting a radio signal.

13. A method for a product dispenser to vend a product to a consumer, the method comprising the steps of:

receiving a radio signal from a transmitter located within a substantially electrically shielded environment physically associated with a receptacle for the product;

determining whether the radio signal includes billing information for a consumer to be charged for the product;

in response to determining that the radio signal includes billing information, determining whether the billing information satisfies at least one predetermined collection;

generating a signal that enables the product dispenser to dispense the product in response to determining that the billing information satisfies the at least one predetermined condition, and receiving a jamming signal that prevents the product dispenser from receiving the radio signal when the product dispenser is not in sufficient proximity to the transmitter.

14. The method of claim 13, further comprising the step of positioning the product dispenser in sufficient proximity to the transmitter to permit reception of the radio signal prior to the step of receiving a radio signal.

15. The method of claim 13, further comprising the step of transmitting an interrogation signal prior to the step of receiving a radio signal, the interrogation signal including a request for the billing information.

16. The method of claim 15, wherein the step of transmitting an interrogation signal comprises the step of repeatedly transmitting the interrogation signal.

17. The method of claim 16, wherein the step of determining whether the radio signal includes billing information comprises the steps of:

extracting a bit sequence from the radio signal;

determining whether the bit sequence correlates to a predetermined bit sequence; and in response to determining that the bit sequence correlates to a predetermined bit sequence, determining that the radio signal includes billing information for a consumer to be charged for the product.

18. The method of claim 13, wherein the billing information comprises a plurality of bits, the method further comprising the step of detecting each bit of the billing information based on at least one phase variation of the radio signal.

19. The method of claim 13, wherein the step of receiving a radio signal comprises the step of receiving the radio signal at a receiver positioned outside the substantially electrically shielded environment.

20. A method for a product receptacle to acquire a product from a product dispenser, the method comprising the steps of:

storing billing information for a consumer to be charged for the product;

generating a radio signal that includes the billing information; transmitting the radio signal from a transmitter located within a substantially electrically shielded environment physically associated with the product receptacle;

transmitting a jamming signal operable to inhibit reception of the radio signal until the receptacle is within sufficiently close proximity of the dispenser as to enable the radio signal to be received notwithstanding said jamming signal, and acquiring the product from the product dispenser into the receptacle responsive to reception of the radio signal.

21. The method of claim 20, wherein the step of generating the radio signal further comprises the step of encrypting the billing information.

22. The method of claim 20, further comprising the step of receiving an interrogation signal from the product dispenser prior to the step of generating a radio signal, the interrogation signal including a request for the billing information.

23. The method of claim 20, wherein the step of generating a radio signal comprises the steps of:
generating a constant frequency signal;
varying a phase of the constant frequency signal over a period of time to represent the billing information, thereby producing a phase modulated signal; and
averaging the phase modulated signal to produce a simulated frequency modulated signal.

24. The method of claim 23, wherein the billing information is represented by a plurality of bits and wherein the step of varying a phase of the constant frequency signal comprises the steps of:
transitioning from a first phase to a second phase during a first portion of a bit transmission period; and
transitioning from the second phase to a third phase during a second portion of the bit transmission period, thereby representing one bit of the billing information as at least two phase transitions.

25. The method of claim 20, wherein the step of transmitting the radio signal comprises the step of transmitting the radio signal primarily via a magnetic field at a carrier frequency of about ten kilohertz or less.

26. A method for a dispensing a product from a product dispenser into a receptacle, the method comprising the steps of:
storing billing information for a consumer to be charged for the product;
generating a radio signal that includes the billing information;
transmitting the radio signal from a transmitter located within a substantially electrically shielded environment physically associated with the product receptacle;
transmitting, from a location other than one within said environment, a jamming signal operable to inhibit reception of the radio signal until the receptacle is within sufficiently close proximity of the dispenser as to enable the radio signal to be received notwithstanding the jamming signal;
receiving the radio signal outside the substantially electrically shielded environment; and
enabling the product to be dispensed in response to receiving the radio signal.

27. The method of claim 26, wherein the step of generating the radio signal further comprises the step of encrypting the billing information.

28. The method of claim 26, further comprising the step of receiving an interrogation signal from the product dispenser prior to the step of generating a radio signal, the interrogation signal including a request for the billing information.

29. The method of claim 26, wherein the step of generating a radio signal comprises the steps of:
generating a constant frequency signal;
varying a phase of the constant frequency signal over a period of time to represent the billing information, thereby producing a phase modulated signal; and
averaging the phase modulated signal to produce a simulated frequency modulated signal.

30. The method of claim 29, wherein the billing information is represented by a plurality of bits and wherein the step of varying a phase of the constant frequency signal comprises the steps of:
transitioning from a first phase to a second phase during a first portion of a bit transmission period; and
transitioning from the second phase to a third phase during a second portion of the bit transmission period, thereby representing one bit of the billing information as at least two phase transitions.

31. The method of claim 26, wherein the step of transmitting the radio signal comprises the step of transmitting the radio signal primarily via a magnetic field at a carrier frequency of about ten kilohertz or less.

32. A method for a product vending device to vend a product to a receptacle for the product, the method comprising the steps of:
transmitting an interrogation signal that includes a request for billing information of a consumer to be charged for the product;
responsive to the interrogation signal, receiving a radio signal;
determining whether the radio signal includes the billing information;
in response to determining that the radio signal includes the billing information, determining whether the billing information satisfies at least one predetermined condition;
enabling the product to be dispensed from the product vending device in response to determining that the billing information satisfies the at least one predetermined condition, and
transmitting a jamming signal operable to inhibit reception of the radio signal unless the vending device and the receptacle are within sufficiently close proximity of one another to enable the radio signal to be received notwithstanding the jamming signal, and
responsive to reception of the radio signal, receiving the product.

33. A method for acquiring a product from a vending device, the method comprising the steps of:
receiving an interrogation signal from the vending device, the interrogation signal requesting billing information for a consumer to be charged for the product;
responsive to the interrogation signal, transmitting a radio from a transmitter located within a substantially electrically shielded enviroment physically associated with a product receptacle signal that includes the billing information;
transmitting, from a location other than one within said environment, a jamming signal operable to inhibit reception of the radio signal until the receptacle is within sufficiently close proximity of the vending device as to enable the radio signal to be received notwithstanding the jamming signal, and
responsive to reception of the radio signal, receiving the product.

34. An apparatus for controlling dispensing of a product, the apparatus being attachable to a product dispenser, the apparatus comprising:
a card reading device that, in response to obtaining billing information for a consumer to be charged for the product, provides the billing information to a creditor of the consumer;
a receiver for receiving a radio signal from a transmitter associated with a receptacle for the product;
a card reader interface, operably coupled to the receiver and the card reading device, that determines whether the radio signal includes billing information for the consumer to be charged and, in response to determining that the radio signal includes the billing information, converts the billing information received from the receiver into a format compatible with the card reading device and generates a control signal to enable the product dispenser to dispense the product, and a jamming circuit, coupled to the card reader interface, that transmits a jamming signal to prevent the receiver from receiving the radio signal until at least a portion of the product dispenser is in sufficient proximity to the receptacle to permit reception of the radio signal.

35. The apparatus of claim 34, further comprising a transmitter, operably coupled to the card reader interface, that transmits, responsive to at least one control signal from the card reader interface, at least one interrogation signal that includes a request for the billing information.

36. A system for vending a product from a dispenser to a receptacle for the product, the system comprising:

a transaction controller that generates control signals to facilitate dispensing of the product;

a first transmitter, operably coupled to the transaction controller and forming a part of the dispenser, that transmits an interrogation signal responsive to a control signal from the transaction controller, the interrogation signal including a request for billing information of a consumer to be charged for the product;

a first receiver, locatable in a substantially electrically shielded environment that is physically associated with the receptacle, that receives the interrogation signal;

a second transmitter, operably coupled to the first receiver, that transmits a radio signal responsive to receipt of the interrogation signal, the radio signal including the billing information;

a second receiver, operably coupled to the transaction controller, that receives the radio signal, demodulates the radio signal to recover the billing information, and provides the billing information to the transaction controller, and a jamming circuit located substantially adjacent to a retainer of the dispenser, that generates and transmits a jamming signal to prevent the second receiver from receiving the radio signal when the dispenser is positioned proximate to the retainer.

37. The apparatus of claim 36, wherein the product is fuel and wherein the receptacle for the product is a portion of a motorized vehicle.

* * * * *